United States Patent
Morimura et al.

(10) Patent No.: US 9,448,853 B2
(45) Date of Patent: Sep. 20, 2016

(54) METHOD OF ALLOCATING PHYSICAL COMPUTING RESOURCE OF COMPUTER SYSTEM

(71) Applicant: Hitachi, Ltd., Tokyo (JP)

(72) Inventors: Tomohiro Morimura, Tokyo (JP); Kojiro Nakayama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/656,744

(22) Filed: Mar. 13, 2015

(65) Prior Publication Data

US 2016/0210175 A1 Jul. 21, 2016

(30) Foreign Application Priority Data

Jan. 19, 2015 (JP) ................................. 2015-007857

(51) Int. Cl.
*G06F 9/455* (2006.01)
*G06F 9/50* (2006.01)

(52) U.S. Cl.
CPC ......... *G06F 9/5077* (2013.01); *G06F 9/45533* (2013.01); *G06F 2009/4557* (2013.01)

(58) Field of Classification Search
CPC .............................................. G06F 2009/4557
USPC .......................................................... 718/1
See application file for complete search history.

(56) References Cited

U.S. PATENT DOCUMENTS

| | | | | |
|---|---|---|---|---|
| 6,877,035 B2 * | 4/2005 | Shahabuddin | ......... | G06Q 10/06 709/226 |
| 7,548,977 B2 * | 6/2009 | Agapi | ..................... | G06F 9/505 370/235 |
| 7,640,344 B2 * | 12/2009 | Kokusho | ............... | G06F 9/5061 709/226 |
| 7,779,415 B2 * | 8/2010 | Bisdikian | .............. | G06F 9/5072 718/105 |
| 8,990,805 B2 * | 3/2015 | Yang | .................... | G06F 9/45558 718/1 |
| 2008/0271038 A1 | 10/2008 | Rolia et al. | | |
| 2009/0106571 A1 * | 4/2009 | Low | ...................... | G06F 9/4856 713/310 |
| 2016/0021024 A1 * | 1/2016 | Parikh | ................... | H04L 47/823 709/226 |

FOREIGN PATENT DOCUMENTS

WO 2008/132924 A1 11/2008

OTHER PUBLICATIONS

Partial European Search Report received in corresponding European Application No. 15159054.4 dated Apr. 28, 2016.

* cited by examiner

*Primary Examiner* — Qing Chen
*Assistant Examiner* — Clint Thatcher
(74) *Attorney, Agent, or Firm* — Mattingly & Malur, PC

(57) ABSTRACT

A storage module holds load information obtained by classifying a load on each of virtual machines into groups depending on a fluctuation characteristic. An allocation schedule creation module predicts the load on each of the virtual machines during a predetermined period based on the load information and a rule defined for each of the groups, determining, for each of the groups, an allocation amount of the physical computing resource to be allocated to at least one of the virtual machines classified into the each of the groups and a time slot for allocation based on the predicted load on each of the virtual machines, and creating a schedule including information on the allocation amount and the time slot that have been determined. A schedule execution module allocates the physical computing resource to each of the virtual machines based on the schedule.

6 Claims, 24 Drawing Sheets

| ID | VM ID | HOST NAME | PRIORITY | UPPER LIMIT RESTRICTION | LOWER LIMIT RESTRICTION | START TIME | END TIME | DURATION | INTERVAL |
|---|---|---|---|---|---|---|---|---|---|
| | | | | | | | | | |
| | | | | | | | | | |
| | | | | | | | | | |
| | | | | | | | | | |
| | | | | | | | | | |

VM ALLOCATION TABLE

PERIODIC

CONSTANT

GRADUALLY-INCREASING

GRADUALLY-DECREASING

IRREGULAR

PERIODIC LOAD PATTERN REGISTRATION TABLE

| REGISTRATION ID | VMID | ALLOCATION | X1 | X2 | T | Y1 | Y2 | START TIME | END TIME |
|---|---|---|---|---|---|---|---|---|---|
| 1 | VM01 | UNALLOCATED | 15 | 45 | 60 | 2800 | 300 | 20140401:00:00 | 20140930:23:59 |
| 2 | VM02 | ALLOCATED | 5 | 55 | 60 | 1500 | 100 | 20140601:00:00 | 20141231:23:59 |
| ⋮ | ⋮ | ⋮ | ⋮ | ⋮ | ⋮ | ⋮ | ⋮ | ⋮ | ⋮ |

*FIG. 7*

CONSTANT LOAD PATTERN REGISTRATION TABLE

| REGISTRATION ID | VMID | ALLOCATION | Y3 | START TIME | END TIME |
|---|---|---|---|---|---|
| 1 | VM03 | UNALLOCATED | 200 | | |
| 2 | VM04 | ALLOCATED | 1000 | | |
| ⋮ | ⋮ | ⋮ | ⋮ | ⋮ | ⋮ |

*FIG. 8*

| 900 | 901 | 902 | 903 | 904 | 905 | 906 | 907 | 908 |
|---|---|---|---|---|---|---|---|---|
| REGISTRATION ID | VMID | ALLOCATION | TYPE | X3 | Y4/Y5 | START TIME | END TIME |
| 1 | VM | UNALLOCATED | INCREASING | 15 | 100 | 20140501 :00:00 | 20140503 :23:59 |
| 2 | VM | UNALLOCATED | DECREASING | 30 | 50 | 20140505 :00:00 | 20140508 :23:59 |
| | | | | | | | |

GRADUALLY-INCREASING/GRADUALLY-DECREASING
LOAD PATTERN REGISTRATION TABLE

*FIG. 9*

| 1000 | 1001 | 1002 | 1003 | 1004 | 1005 | 1006 | 1007 |
|---|---|---|---|---|---|---|---|
| REGISTRATION ID | VMID | ALLOCATION | AVG | VX | START TIME | END TIME |
| 1 | | ALLOCATED | | | | |
| 2 | | UNALLOCATED | | | | |
| ⋮ | ⋮ | ⋮ | ⋮ | ⋮ | ⋮ | ⋮ |

IRREGULAR LOAD PATTERN REGISTRATION TABLE

*FIG. 10*

| 1100 | 1101 | 1102 | 1103 | 1104 | 1105 | 1106 | 1107 | 1108 | 1109 | 1110 |
|---|---|---|---|---|---|---|---|---|---|---|
| | ID | VM ID | HOST NAME | PRIORITY | UPPER LIMIT RESTRICTION | LOWER LIMIT RESTRICTION | START TIME | END TIME | DURATION | INTERVAL |
| | | | | | | | | | | |
| | | | | | | | | | | |
| | | | | | | | | | | |
| | | | | | | | | | | |
| | | | | | | | | | | |
| | | | | | | | | | | |

VM ALLOCATION TABLE

| 1300 | 1301 | 1302 | 1303 | 1304 | 1305 | 1306 |
|---|---|---|---|---|---|---|
| | VMID | TENANT ID | SYSTEM ID | SYSTEM TYPE | FUNCTION TYPE | PERFORMANCE CONDITION |
| | VM01 | Tenant001 | Sys001 | Web3Tier | WEB SERVER | BEST EFFORT |
| | VM02 | Tenant002 | Sys002 | Batch | CALCULATION SERVER | PERFORMANCE ASSURING |
| | VM03 | Tenant001 | Sys001 | Web3Tier | DB SERVER | PERFORMANCE ASSURING |
| | VM04 | Tenant001 | Sys001 | Web3Tier | AP SERVER | BEST EFFORT |
| | ⋮ | ⋮ | ⋮ | ⋮ | ⋮ | ⋮ |

VM MANAGEMENT TABLE

FIG. 13

| 1400 | 1401 | 1402 | 1403 |
|---|---|---|---|
| | CONSTRAINT ID | CONSTRAINT TYPE | CONSTRAINT TARGET |
| | 0001 | EXCLUSIVE | VM02, VM03 |
| | 0002 | SHARING | VM01, VM04 |
| | ⋮ | ⋮ | ⋮ |

CONSTRAINT MANAGEMENT TABLE

FIG. 14

HOST CPU LOAD PATTERN CORRESPONDENCE TABLE

| Host ID | TYPE | PERIOD |
|---|---|---|
| Host A | N/A | N/A |
| Host B | CONSTANT | N/A |
| Host C | PERIODIC | 60 |
| Host D | GRADUALLY-INCREASING | N/A |
| Host E | IRREGULAR | N/A |
| ⋮ | ⋮ | ⋮ |

*FIG. 15*

HOST CPU ALLOCATION AMOUNT MANAGEMENT TABLE

| ID | Time Slot | Host ID | CPU UTILIZATION | AVAILABLE CPU CAPACITY |
|---|---|---|---|---|
| | 201407010900 | HosT A | | |
| | 201407010900 | Host B | | |
| | 201407010900 | Host C | | |
| | ⋮ | | | |
| | 201407010905 | Host A | 2500 | 500 |
| | 201407010905 | Host B | | |
| | 201407010905 | Host C | | |
| | ⋮ | | | |
| | 201407010910 | Host A | 200 | 2800 |
| | 201407010910 | Host B | | |
| | 201407010910 | Host C | | |
| | ⋮ | | | |

*FIG. 16*

METHOD OF ALLOCATING PHYSICAL COMPUTING RESOURCE OF COMPUTER SYSTEM

CLAIM OF PRIORITY

The present application claims priority from Japanese patent application JP2015-007857 filed on Jan. 19, 2015, the content of which is hereby incorporated by reference into this application.

BACKGROUND

In recent years, a service called a cloud computing service (hereinafter referred to simply as "cloud") has become widespread. In the cloud, computing resources such as a server, a network apparatus, and a storage are acquired as virtual resources, and a user is allowed to use the computing resources depending on the user's demand, to be charged therefor. In general, in the cloud, a plurality of users share and use virtual computing resources obtained by virtualizing physical computing resources. Such a general virtualization technology includes a server virtualization technology, and a virtualized server is referred to as a virtual machine (hereinafter referred to simply as "VM"), and computing resources of a physical server are acquired for the user depending on his/her demand and allocated to the VM in accordance with a contract therewith.

Such an environment in which the physical computing resources are allocated to a plurality of users in accordance with contracts therewith is referred to as "multitenant environment", and in the cloud, a physical computing resource is shared by a plurality of tenants (contracting entities) while the physical computing resource is exclusively used in a related-art information system. Therefore, there has risen a problem of instability in performance due to the sharing among the plurality of users, which has not been a problem in the related-art information system. In view of such a problem, a vendor of the information system has started providing a cloud service called "managed cloud" as a cloud whose performance stability and reliability are improved.

In the managed cloud, in order to ensure the performance stability, when the physical computing resource is virtualized and acquired, the physical resource is allowed to be exclusively used without being shared so that the performance can be isolated among the tenants. Because of such a configuration for the exclusive use, it is possible to ensure the performance stability. On the other hand, the exclusive configuration inhibits effective use of resources, which has been an advantage of the virtual computing resources.

WO2008/132924 discloses a technology for optimizing a period and calculation time of a CPU to be allocated depending on a load on an application executed by the virtual machine. In WO2008/132924, a problem that "a load fluctuates" is handled by means for "randomizing a period for carrying out optimization processing".

SUMMARY

In the related-art technology, the optimization processing corresponding to fluctuations in the load needs to be carried out on each occasion, which leads to an enormous calculation processing amount. Accordingly, it is desired to provide a technology capable of reducing the calculation processing amount while realizing both ensured performance stability and maintained utilization efficiency of a computing resource in a multitenant environment.

A representative example of the invention a method of allocating a physical computing resource of a computer system comprising a plurality of virtual machines, the method comprising: holding, by a storage module, load information obtained by classifying a load on each of the plurality of virtual machines into a plurality of groups depending on a fluctuation characteristic; predicting, by an allocation schedule creation module, the load on each of the plurality of virtual machines during a predetermined period based on the load information and a rule defined for each of the plurality of groups, determining, for each of the plurality of groups, an allocation amount of the physical computing resource to be allocated to at least one of the plurality of virtual machines classified into the each of the plurality of groups and a time slot for allocation based on the predicted load on each of the plurality of virtual machines, and creating a schedule comprising information on the allocation amount and the time slot that have been determined; and allocating, by a schedule execution module, the physical computing resource to each of the plurality of virtual machines based on the schedule.

An aspect of the invention is capable of reducing the calculation processing amount while realizing both ensured performance stability and maintained utilization efficiency of a computing resource in a multitenant environment.

BRIEF DESCRIPTION OF THE DRAWINGS

FIG. 7 is an example of a periodic load pattern registration table within a load pattern DB.

FIG. 8 is an example of a constant load pattern registration table within the load pattern DB.

FIG. 9 is an example of a gradually-increasing/gradually-decreasing load pattern registration table within the load pattern DB.

FIG. 10 is an example of an irregular load pattern registration table within the load pattern DB.

FIG. 12A is a graph showing a kind of an allocation setting of a VM (priority), and a load constraint employed when the priority is set.

FIG. 12B is a graph showing a kind of the allocation setting of the VM (upper limit restriction), and the load constraint employed when the upper limit restriction is set.

FIG. 12C is a graph showing a kind of the allocation setting of the VM (lower limit restriction), and the load constraint employed when the lower limit restriction is set.

FIG. 13 is an example of a VM management table.

FIG. 14 is an example of a constraint management table.

FIG. 15 is an example of a host CPU management table.

FIG. 16 is an example of a host CPU allocation amount management table.

DETAILED DESCRIPTION OF EMBODIMENT

Hereinafter, embodiments of this invention will be described with reference to the accompanying drawings. In the following description, information in the embodiments will be expressed as "AAA table", "AAA list", "AAA queue", "AAA matrix", and the like; however, the information may be expressed in a data structure other than the table, list, queue, matrix and the like.

Furthermore, in describing the specifics of the information, terms such as "identification information", "identifier", "name", "ID", "number" and the like are used. They are assigned to distinguish logical objects in addition to physical objects such as devices and parts and may be replaced with one another.

In the following description, descriptions may be provided with subjects of "program" but such descriptions can be replaced by those having subjects of "processor" because a program is executed by a processor to perform predetermined processing using a memory and an interface. Furthermore, the processing disclosed by the descriptions having the subjects of program may be regarded as the processing performed by a computer such as a management computer or an information processing apparatus. A part or the entirety of a program may be implemented by dedicated hardware. Various programs may be installed in computers through a program distribution server or a computer-readable storage medium.

An embodiment of this invention is described by taking as a subject a service for providing a computing resource (also referred to as "IT resource") in a cloud service.

Figure 1:
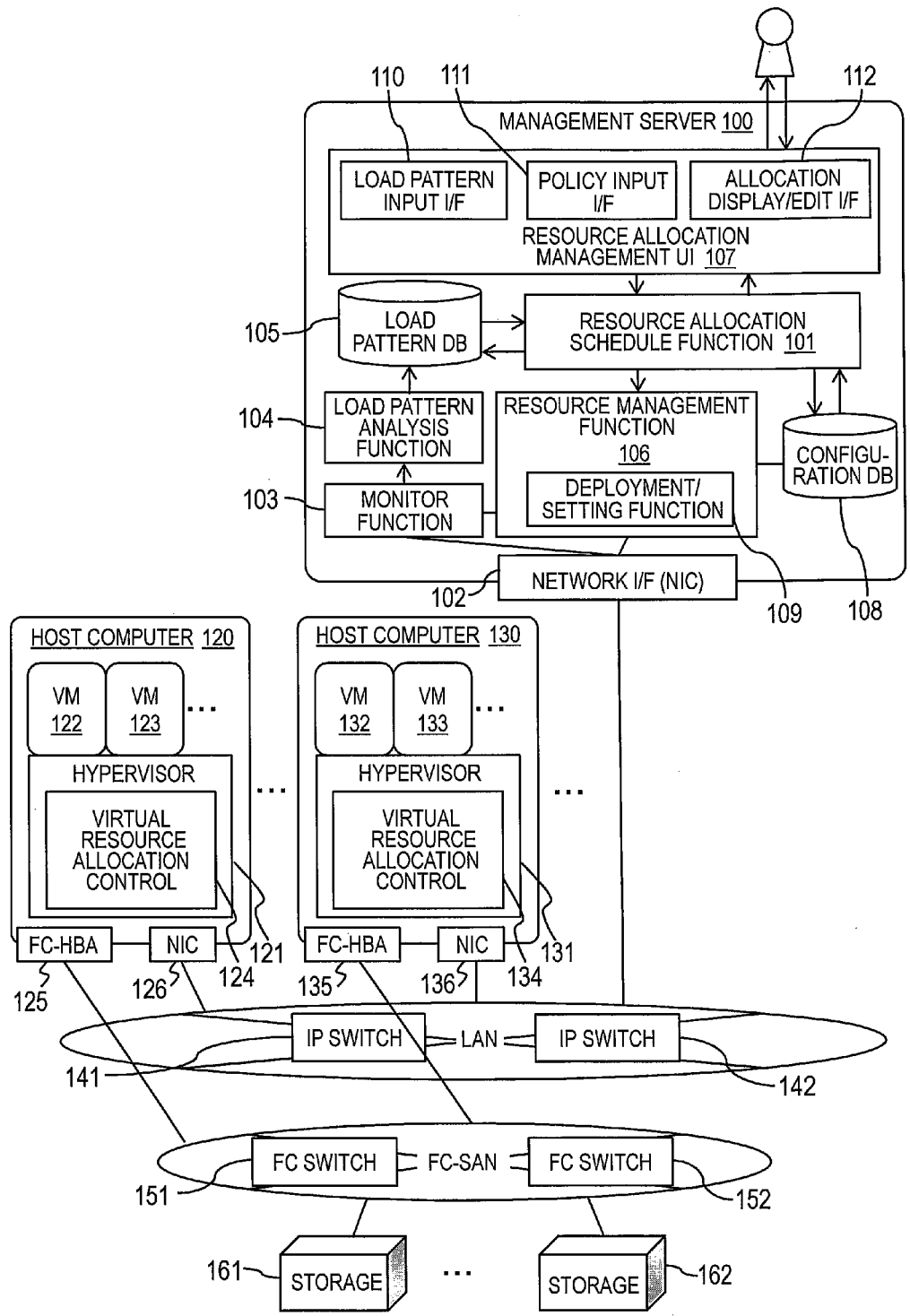
FIG. 1 is a system configuration diagram of an embodiment of this invention.

FIG. 1 schematically illustrates an information system operated in the cloud service described as the subject of this embodiment and a configuration for operations/management thereof.

A computing resource group provided in the cloud service is provided based on a contract by a management server 100, and is managed so as to maintain statuses (performance, operating status, and security status) based on the contract.

The management server 100 includes a resource allocation schedule function 101 for controlling and managing allocation of the computing resource to a tenant, a network I/F 102 for communicating to/from the provided computing resource, a monitor function 103 for monitoring an operating status, a performance status, security soundness, and the like of the provided computing resource, a load pattern analysis function 104 for classifying a load characteristic into four kinds of load pattern based on accumulation of monitoring data on the computing resource, a load pattern DB 105 serving as a data archive for classifying the load characteristic of the provided computing resource to be registered as patterns based on the analysis made by the load pattern analysis function 104, load characteristics provided by a user, and the like, a resource management function 106 having functions such as deployment, setting, and management of the provided computing resource, a resource allocation management UI 107 for presenting a user interface (hereinafter referred to as "UI") for allocation management of the computing resource to an administrator who manages the cloud service, and a configuration DB 108 for storing configuration information of the whole information system in the cloud service.

It should be noted that the configuration in which the above-mentioned function groups are implemented together in the management server 100 is described, but those functions may exist on separate servers and communicate to/from one another for control and management thereof.

Further, the management server 100 is formed of one physical server, but may be configured so that those function groups are arranged across a plurality of physical servers and communicate to/from one another.

The resource management function 106 is a function for the management of the computing resource provided as the cloud service, and includes a deployment/setting function 109 having a function of for controlling: setting for acquiring a fixed amount of virtual computing resources from a host computer serving as a physical computing resource, a network apparatus (router, IP switch, or Fibre Channel switch (hereinafter abbreviated to as "FC switch")), a storage array apparatus (hereinafter abbreviated to simply as "storage") for storing data, and the like; and operations such as activation, termination, suspend, resume from suspend, and the like of the virtual computing resource of the acquired VM or the like.

The computing resource allocation management UI 107 includes a load pattern input interface 110 for supplying the load characteristic of an application or the like in the computing resource such as the VM received from the user as an input, a policy input interface 111 for inputting a policy serving as a guideline for operating the computing resource such as the VM designated by the user, and an allocation display/edit function 112 having a function of acquiring the virtual computing resource corresponding to the physical computing resource created by the computing resource allocation schedule function 101, presenting an allocation schedule to the user, and allowing the user to edit the presented schedule.

The policy is a guideline regarding the performance of the computing resource to be provided. The policy includes a performance requirement guideline such as whether the performance is to be of a "performance-assuring type" or a "best-effort type", a target numerical value for utilization efficiency of the computing resource, a guide value, and a constraint for a physical arrangement of the acquired virtual computing resource. It should be noted that the physical constraint includes a constraint such as sharing or exclusion in terms of the allocation of the virtual resource to the physical resource, for example, whether a first virtual computing resource and a second virtual computing resource are not to share the same physical computing resource or need to share the same physical computing resource.

The management server 100 has, for example, a general computer hardware configuration. Specifically, the management server 100 includes an input device, an output device, a processor, a memory, an auxiliary storage device, and the network I/F 102. The input device is a device used by the user for issuing an instruction. The input device is, for example, a keyboard, a pointing device, a touch panel, or a microphone. The output device is a device used by the management server 100 for outputting information to the user. The output device is, for example, a monitor display, a speaker, or a printer.

The auxiliary storage device is, for example, a hard disk drive (HDD) or a solid state drive (SSD), and data stored on the auxiliary storage device is loaded into the memory. The auxiliary storage device stores, for example, programs to be executed by the load pattern DB 105, the configuration DB 108, and the processor. The memory stores the program to be executed by the processor and data to be used by the program. The processor executes the programs stored in the memory, and operates as a function module for implementing the above-mentioned functions of the management server 100, for example, the computing resource allocation schedule function 101 and the load pattern analysis function 104.

Figure 2:
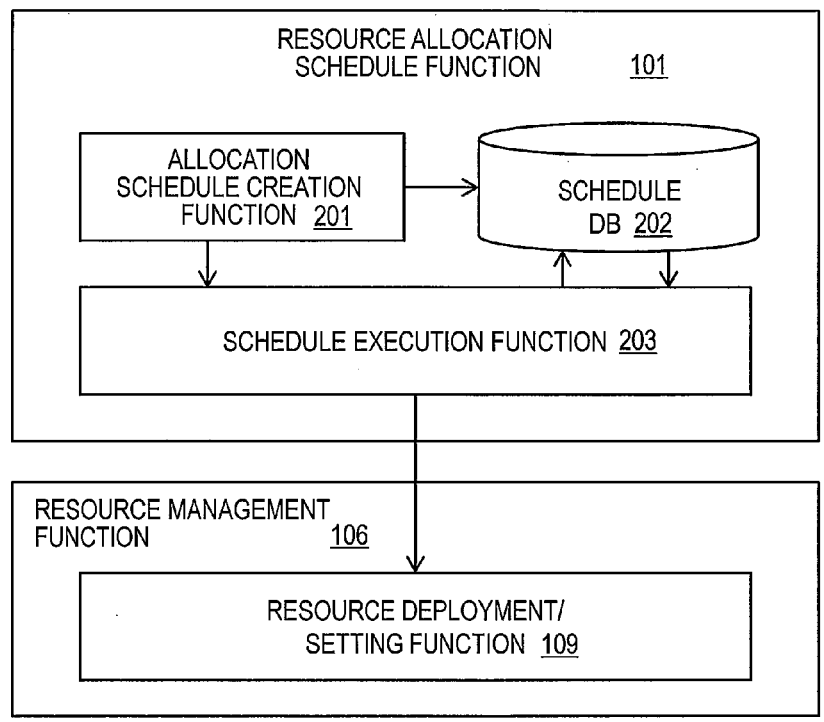
FIG. 2 is a configuration diagram of a computing resource allocation schedule function.

FIG. 2 illustrates a detailed configuration of the resource allocation schedule function 101 and the resource management function 106. The resource allocation schedule function 101 determines the physical computing resource serving as an allocation target based on the load pattern stored in the load pattern DB 105. Further, the resource allocation schedule function 101 includes an allocation schedule creation function 201 for creating a schedule for a time slot for acquiring the physical computing resource as the virtual computing resource or other such schedule, a schedule DB 202 for storing the created allocation schedule, and a schedule execution function 203 for instructing the deployment/setting function 109 to acquire the physical computing resource as the virtual computing resource and set an allocation amount based on the schedule registered in the schedule DB 202.

Figure 3:
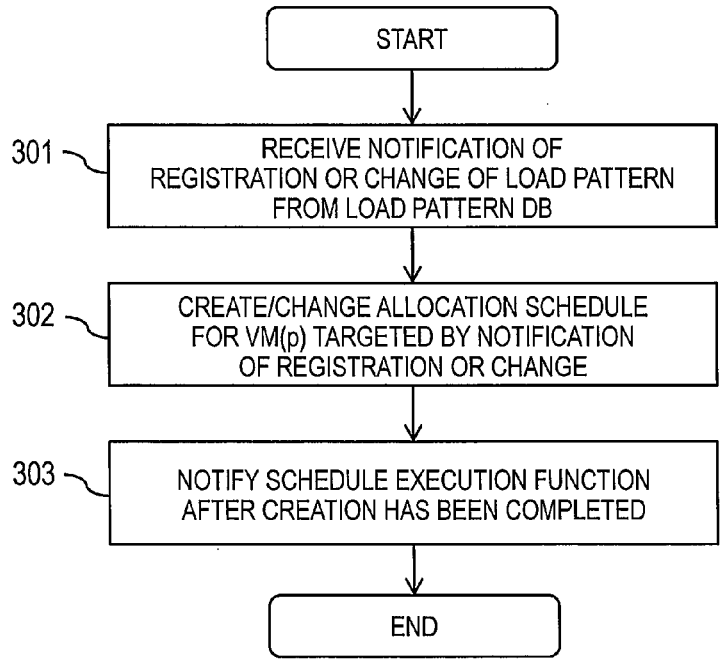
FIG. 3 is a processing flow of the computing resource allocation schedule function.

FIG. 3 is a diagram illustrating a processing flow of the allocation schedule creation function 201.

In Step 301, the allocation schedule creation function 201 receives a notification of registration or change of the load pattern from the load pattern DB 105.

In Step 302, the allocation schedule creation function 201 creates/changes the allocation schedule for a VM (hereinafter referred to as "VM(p)", a plurality of VMs are allowed) targeted by the notification of registration or change. The allocation schedule is described later in detail with reference to FIG. 5.

In Step 303, the allocation schedule creation function 201 notifies the schedule execution function 203 that the allocation schedule for the VM(p) has been created.

Figure 4:
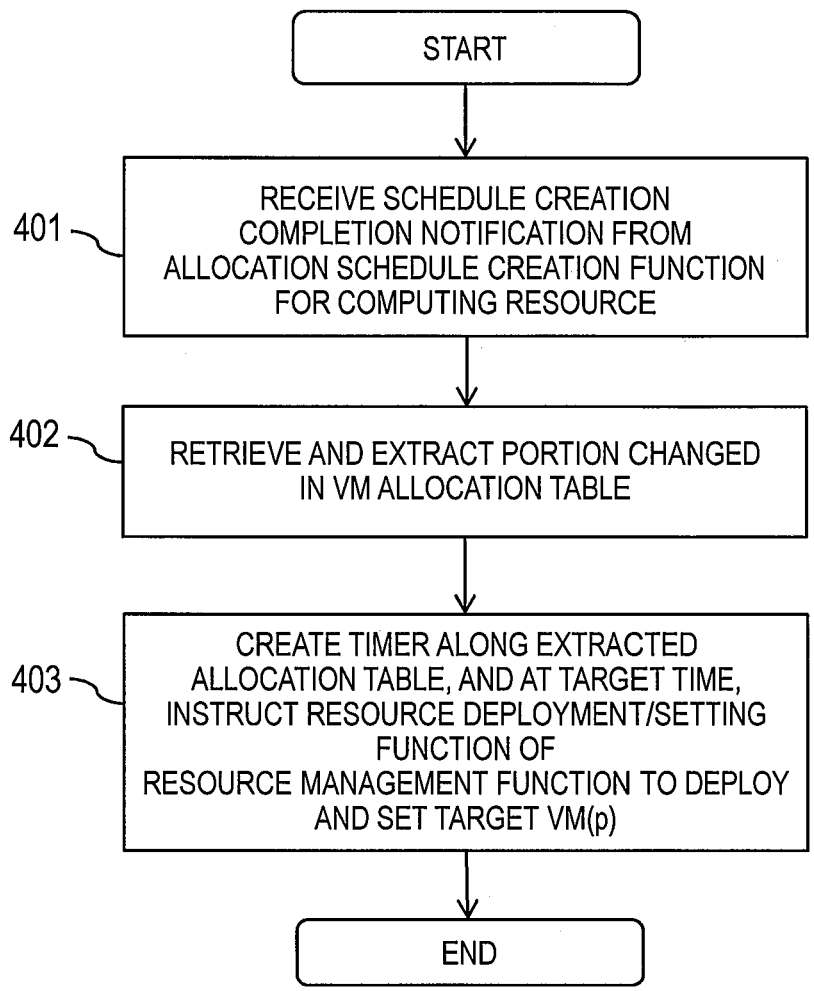
FIG. 4 is a processing flow of a schedule execution function.

FIG. 4 is a diagram illustrating a processing flow in which the schedule execution function 203 instructs the deployment/setting function 109 to set the allocation amount of the computing resource with respect to the target VM(p) based on the allocation schedule stored in the schedule DB 202.

Specifically, in Step 401, the schedule execution function 203 receives a schedule creation completion notification from the allocation schedule creation function 201 for the computing resource. In Step 402, the schedule execution function 203 retrieves and extracts a portion changed in a VM allocation table 1100 described later. In Step 403, the schedule execution function 203 creates a timer based on the extracted allocation table, and at a target time, instructs a resource deployment/setting function of the resource management function 106 to deploy and set the target VM(p).

Figure 5:
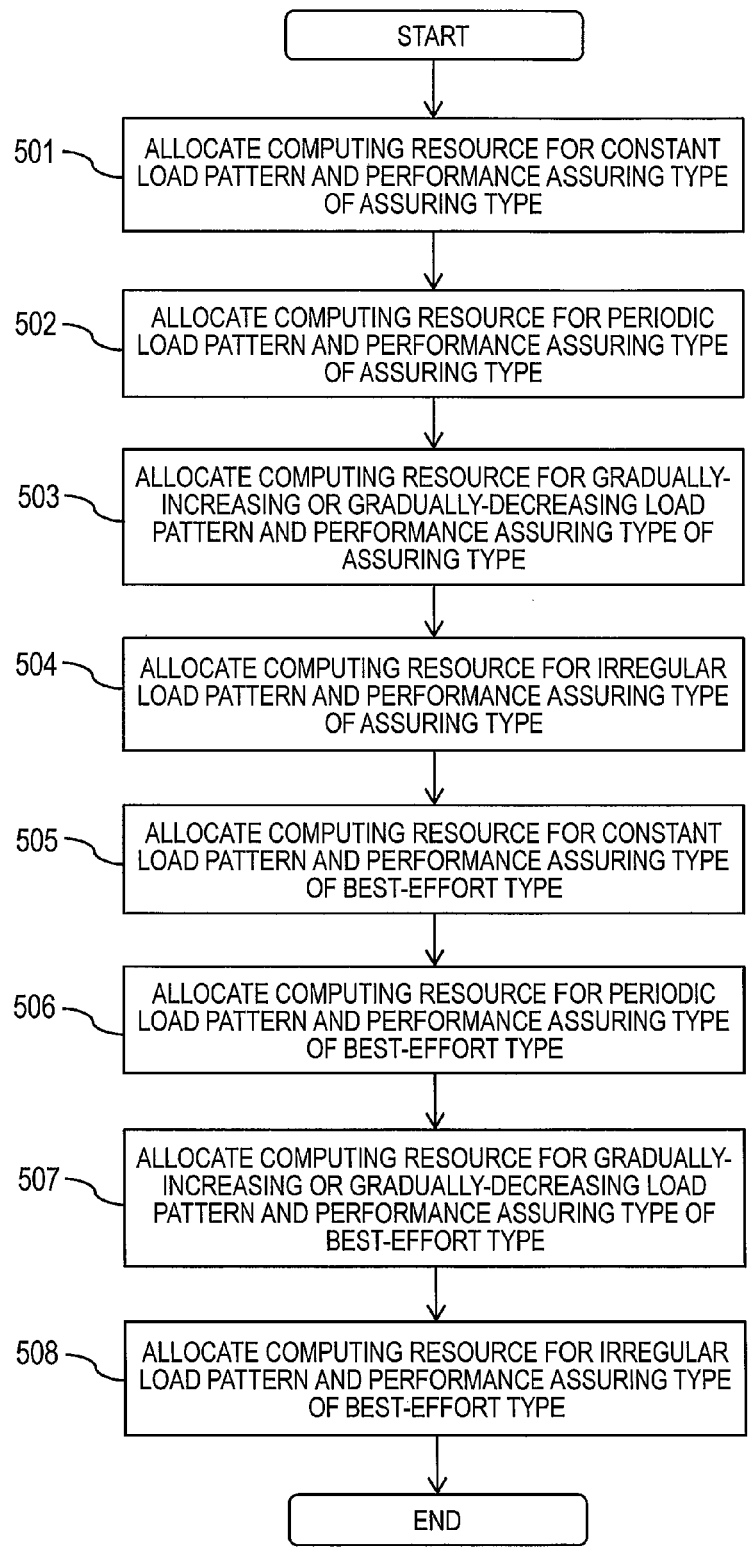
FIG. 5 is a processing flow of an allocation schedule creation function.

FIG. 5 is a detailed flow of processing in which the allocation schedule creation function 201 creates the allocation schedule based on the load pattern of the allocation target VM(p). This flow illustrates respective steps of the processing in which the physical computing resources are allocated to the target virtual computing resources in accordance with a predetermined priority based on the type of load pattern. It should be noted that the computing resource group to be the allocation target here is one for which the registration or change of the load pattern has been received in Step 301 of FIG. 3, namely, the VM group for which the load pattern has been registered or changed.

The allocation schedule is created based on the policy and the contract regarding the type of load pattern and the performance in order of: (1) the allocation for a "constant load pattern" and a "performance-assuring type" (Step 501); (2) the allocation for a "periodic load pattern" and the "performance-assuring type" (Step 502); (3) the allocation for a "gradually-increasing or gradually-decreasing load pattern" and the "performance-assuring type" (Step 503); and (4) the allocation for an "irregular load pattern" and the "performance-assuring type" (Step 504) by setting the allocation in consideration of the constraint for the VM(p) and creating time information to be applied thereto.

Once a series of computing resource allocation for the "performance-assuring type" are completed, the next series of computing resource allocation for the "best-effort type" in which performance requirements are loose (for example, no penalty is imposed for violated performance) are carried out in accordance with the load patterns in the same order from Step 505 to Step 509.

FIGS. 6A to 6D are schematic graphs showing four load patterns registered in the load pattern DB 105 by the load pattern analysis function 104 or by the user through the load pattern input interface 110. In the load pattern DB 105, the load on a virtual machine is classified into a plurality of groups depending on a fluctuation characteristic.

Figure 6A:
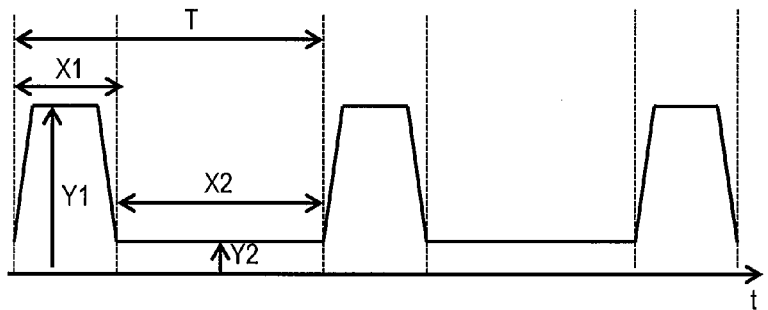
FIG. 6A is a graph showing a periodic load pattern.

FIG. 6A shows a load pattern having a peak in every fixed period T, which is defined as "periodic load pattern". This load pattern is often observed as a characteristic of the load caused by a batch job or the like for executing predetermined processing on a regular basis. This load pattern is recorded in a periodic load pattern registration table 700 described later with reference to FIG. 7 with a fixed peak period within the period as X1, a low-load period as X2, a load level at the peak as Y1, and a load level at a low-load time as Y2.

Figure 6B:
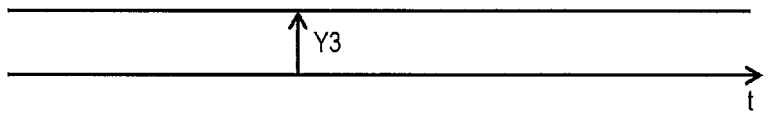
FIG. 6B is a graph showing a constant load pattern.

FIG. 6B shows a load pattern in which the load maintains a fixed value Y3 and rarely fluctuates, which is defined as "constant load pattern". This load pattern is recorded in a constant load pattern registration table 800 described later with reference to FIG. 8.

Figure 6C:
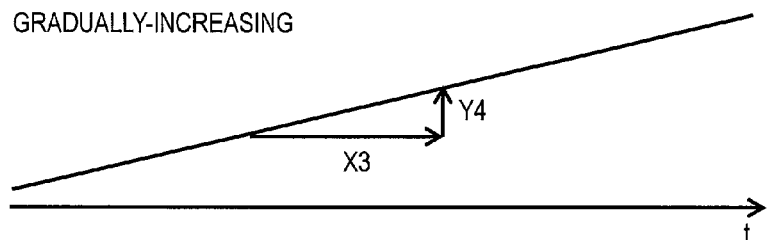
FIG. 6C is a graph showing a gradually-increasing load pattern.
Figure 6D:
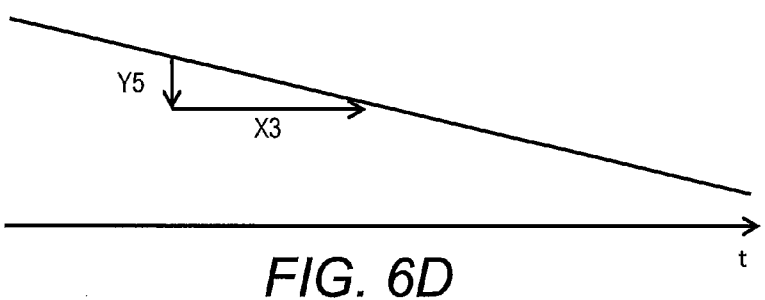
FIG. 6D is a graph showing a gradually-decreasing load pattern.

FIG. 6C shows a load pattern in which the load increases with a fixed ratio, which is defined as "gradually-increasing load pattern". FIG. 6D shows a load pattern in which the load decreases with a fixed ratio, which is defined as "gradually-decreasing load pattern". Those load patterns are often observed as the load pattern in an EC site of e-commerce or the like. Those load patterns are recorded in a gradually-increasing/gradually-decreasing load pattern registration table 900 described later with reference to FIG. 9 as a load pattern in which the load increases (or decreases) by Y4 during a fixed period X3.

Figure 6E:
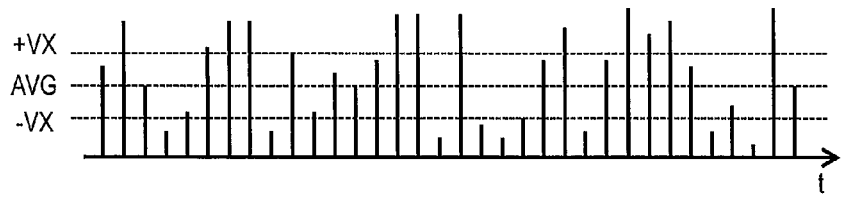
FIG. 6E is a graph showing an irregular load pattern.

FIG. 6E shows a load pattern exhibiting no regularity in distribution in terms of time and space as the characteristic of the load, which is defined as "irregular load pattern". In the irregular load pattern, an average value AVG of the load level and a numerical value VX indicating a spread of a dispersion from an average value (for example, value such as a standard deviation or value obtained by doubling or tripling the same) are recorded in an irregular load pattern registration table 1000 described later with reference to FIG. 10. It should be noted that a numerical value indicating the spread of the dispersion from the average value may be used as the numerical value indicating the spread of the dispersion from an average. In this case, the value obtained by, for example, doubling or tripling the standard deviation may be used in consideration of a probability distribution.

A determination method, an approximation method, or the like for the classification of the load patterns shown in FIGS. 6A to 6E are carried out by the load pattern analysis function 104 with a certain method, or input as hint information by the user through the load pattern input interface 110.

FIG. 7 shows the periodic load pattern registration table 700 stored in the load pattern DB 105. The periodic load pattern is recorded in the periodic load pattern registration table 700 when registered in the load pattern DB by the load pattern analysis function 104 or through the load pattern input interface 110. The virtual machine exhibiting a fluctuation of the load increasing/decreasing periodically at a predetermined period is classified into the group of the periodic load pattern.

The periodic load pattern registration table 700 includes, for each registered load pattern, a column 701 indicating a registration ID, a column 702 indicating a VM ID for uniquely identifying the virtual computing resource of the VM or the like having the load pattern, a column 703 indicating whether or not the VM having the load pattern is allocated to the physical computing resource such as the host computer, a column 704 indicating the peak period X1, a column 705 indicating the low-load period X2, a column 706 indicating the period T, a column 707 indicating the load level Y1 at the peak period X1, a column 708 indicating the load level Y2 at the low-load time, a column 709 indicating a start time at which this load pattern starts, and a column 710 indicating an end time, which are saved in association with one another.

The allocation 703 records "allocated" if a given virtual computing resource has been allocated to the physical computing resource and "unallocated" if the allocation is unfinished.

FIG. 8 shows the constant load pattern registration table 800 stored in the load pattern DB 105. The constant load pattern is recorded in the constant load pattern registration table 800 when registered in the load pattern DB by the load pattern analysis function 104 or through the load pattern input interface 110. The virtual machine exhibiting the load fluctuation that falls within a predetermined range during a predetermined period is classified into the group of the constant load pattern.

The constant load pattern registration table 800 includes, for each registered load pattern, a column 801 indicating a registration ID, a column 802 indicating the VM ID for uniquely identifying the virtual computing resource of the VM or the like having the load pattern, a column 803 indicating whether or not the VM having the load pattern is allocated to the physical computing resource such as the host computer, a column 804 indicating a fixed load level Y3, a column 805 indicating the start time at which this load pattern starts, and a column 806 indicating the end time, which are saved in association with one another.

FIG. 9 shows the gradually-increasing/gradually-decreasing load pattern registration table 900 stored in the load pattern DB 105. The gradually-increasing or gradually-decreasing load pattern is recorded in the gradually-increasing/gradually-decreasing load pattern registration table 900 when registered in the load pattern DB by the load pattern analysis function 104 or through the load pattern input interface 110. The virtual machine exhibiting a fluctuation of the load increasing/decreasing with a lapse of time and with a fixed ratio is classified into the group of gradually-increasing/gradually-decreasing load patterns.

The gradually-increasing/gradually-decreasing load pattern registration table 900 includes, for each registered load pattern, a column 901 indicating a registration ID, a column 902 indicating the VM ID for uniquely identifying the virtual computing resource of the VM or the like having the load pattern, a column 903 indicating whether or not the VM having the load pattern is allocated to the physical computing resource such as the host computer, a column 904 indicating a type of gradually-increasing/gradually-decreasing, a column 905 indicating the fixed period X3, a column 906 indicating any one of an increment Y4 corresponding to the fixed period X3 in a case of gradually-increasing and a decrement Y5 in a case of gradually-decreasing, a column 907 indicating the start time at which this load pattern starts, and a column 908 indicating the end time, which are saved in association with one another.

FIG. 10 shows the irregular load pattern registration table 1000 stored in the load pattern DB 105. The irregular load pattern is recorded in the irregular load pattern registration table 1000 when registered in the load pattern DB by the load pattern analysis function 104 or through the load pattern input interface 110. The virtual machine exhibiting a fluctuation of the load changing irregularly is classified into the group of the irregular load pattern.

The irregular load pattern registration table 1000 includes, for each registered load pattern, a column 1001 indicating a registration ID, a column 1002 indicating the VM ID for uniquely identifying the virtual computing resource of the VM or the like having the load pattern, a column 1003 indicating whether or not the VM having the load pattern is allocated to the physical computing resource such as the host computer, a column 1004 indicating the average value AVG of the load, a column 1005 indicating a numerical value VX representing the spread of the dispersion from the average value of the load, a column 1006 indicating the start time at which this load pattern starts, and a column 1007 indicating the end time, which are saved in association with one another.

Figure 11:
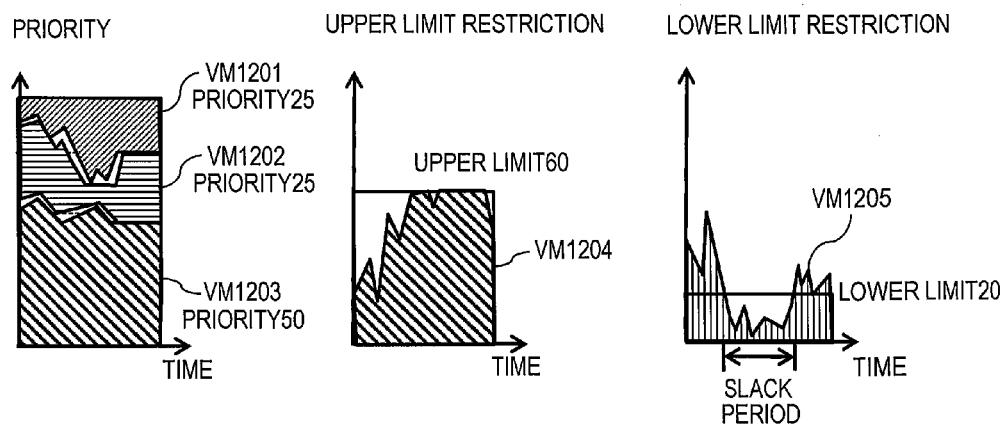
FIG. 11 is an example of a VM allocation table.

FIG. 11 shows the VM allocation table 1100 for storing the setting information on the allocation in regard to the schedule created by the allocation schedule creation function 201.

The VM allocation table 1100 includes a column 1101 indicating an ID serving as identification information on an allocation setting, a column 1102 indicating a VM ID serving as identification information on the virtual computing resource such as the VM to be the target, a column 1103 indicating a host name for identifying the physical computing resource such as the host computer to which the virtual computing resource such as the VM is to be allocated, a column 1104 indicating a priority relating to reservation of an allocation resource amount in the case where the virtual computing resource is allocated to the physical computing resource, a column 1105 indicating an upper limit value of the resource amount to be allocated, a column 1106 indicating a lower limit allocation amount that guarantees minimum allocation in regard to the resource amount to be allocated when the load increases, a column 1107 indicating the start time of the allocation setting, a column 1108 indicating the end time of the allocation setting, a column 1109 indicating a duration in a case where resource allocation is periodically changed, and a column 1110 indicating an interval at which the setting is disabled (in other words, another allocation setting is enabled), which are saved in association with one another.

The host name 1103 may be, for example, a fully qualified domain name (FQDN) of the host computer, a host name obtained by removing a domain part from the FQDN and managed by an OS, or an IP address of a network interface card (NIC) 126, 136, or the like, being an expansion card for a network I/F included in the host computer.

FIGS. 12A to 12C show how the virtual computing resource such as the VM is allocated to the physical computing resource such as the host computer.

The priority of FIG. 12A is an index for indicating to which VM the physical resource is preferentially allocated when the loads on the VM group allocated to the host computer are high. For example, the value called "share" in a virtualization technology corresponds to the above-mentioned priority. In accordance with the set share, a resource allocation amount of the host computer with respect to the VM at a time of a high load is automatically adjusted. The high value indicates the high priority, allowing more physical computing resources than the virtual computing resource having a low priority to be allocated. Therefore, in the example of FIG. 12A, a VM 1203 having a priority of 50 has twice as high a priority as a VM 1201 and a VM 1202 each having a priority of 25, and hence the allocation amount of the CPU of the host computer to be allocated is approximately twice as high as each thereof.

An upper limit restriction of FIG. 12B shows a numerical value regarding such an upper limit restriction of the allocation amount that more computing resources than a value set as an upper limit are not to be allocated even when the load on a given virtual computing resource, for example, the VM, is extremely high.

A lower limit restriction of FIG. 12C shows such a lower limit value of the computing resource that the minimum allocation is always guaranteed when the load becomes higher than the set value of the lower limit restriction during the allocation. It should be noted that when an actual load is lower than the value of the lower limit restriction, resources less than the resource allocation amount indicated by the above-mentioned lower limit restriction is allocated. For example, in a certain virtualization technology, the lower limit restriction is expressed by a concept of "reservation", and is set as a reservation amount that is always reserved when there is a load.

FIG. 13 shows a VM management table 1300 for holding the management information relating to the VM in the configuration DB 108.

The VM management table 1300 includes a column 1301 indicating the VM ID serving as the identification information on the virtual computing resource such as the VM to be the target, a column 1302 indicating a tenant ID serving as identification information for uniquely identifying a tenant to which the VM belongs, a column 1303 indicating a system ID serving as identification information for identifying an application system to which the VM belongs, a column 1304 indicating a system type, which being a type such as a three-tier Web system (indicated as Web3Tier in FIG. 13), a batch system (indicated as Batch in FIG. 13), or a Hadoop system, a column 1305 indicating a type of function such as a Web server, an application (AP) server, or a batch job server, and a column 1306 for distinguishing a performance condition between a performance-assuring type (in which the performance defined as contract information relating to the performance for the VM is guaranteed) and a best-effort type (in which the performance guarantee is a nonbinding target, in other words, is not guaranteed although the performance is controlled to reach the target as much as possible), which are saved in association with one another. The performance condition (column 1306) may be determined in accordance with a contract with the user, or may be input to be designated by the user through the policy input interface 111.

FIG. 13 shows that a VM01, a VM03, and a VM04 are server computers belonging to an application system Sys001 of the three-tier Web (Web3Tier) within a tenant of Tenant001 and playing roles of the Web server, the DB server, and the AP server, respectively, and that a VM02 is a server computer belonging to an application system Sys002 of the batch system (Batch) within a tenant of Tenant002 and playing a role of a calculation server.

In regard to the performance condition, FIG. 13 shows that the "performance-assuring type" is designated for the VM02 and the VM03 and that the "best-effort type" is designated for the VM01 and the VM04.

FIG. 14 shows a constraint management table 1400 for managing the constraint relating to the allocation of the virtual computing resource with respect to the physical computing resource. The constraint management table 1400 includes a column 1401 indicating a constraint ID serving as identification information for identifying an individual constraint, a column 1402 indicating a type of constraint relating to the physical arrangement in the case of the allocation of the virtual computing resource with respect to the physical computing resource, the type of constraint including "sharing" indicating that at least two virtual computing resources need to be allocated to the same physical computing resource or "exclusive" indicating that at least two virtual computing resources need to be allocated to different physical computing resources, and a column 1403 indicating the virtual computing resource such as the VM to be subjected to the constraint, which are saved in association with one another.

The constraint target 1403 may be, for example, a data structure for holding at least one virtual computing resource such as a list, or may be separately stored as a data structure indicating a set including at least one virtual computing resource to cause identification information or reference information indicating the set to be stored in the column. The example of FIG. 14 shows that the constraint of "exclusive" exists for the VM02 and the VM03, and that the constraint of "sharing" exists for the VM01 and the VM04.

In each step of FIG. 5, the allocation schedule creation function 201 refers to the constraint to allocate the same physical computer to the virtual machines to which the same physical computing resource is to be allocated and to allocate different physical computing resources to the virtual machines to which different physical computing resources are to be allocated. Details thereof are described later with reference to FIG. 18, FIG. 21, FIG. 24, and FIG. 27. FIG. 15 shows a host CPU load pattern correspondence table 1500 serving as information for managing an association between the load pattern and the allocation of a virtual resource with respect to the physical computing resource.

The host CPU load pattern correspondence table 1500 is stored in the schedule DB 202.

The host CPU load pattern correspondence table 1500 includes a column 1501 indicating a host ID serving as information for identifying the physical computing resource such as the host computer, a column 1502 indicating the type of load pattern to be allocated, and a column 1503 indicating the period when the type of load pattern to be allocated is "periodic", which are saved in association with one another.

In the example of FIG. 15, the host computer, whose host ID is Host A, has the type of "N/A" indicating a state where the VM serving as the virtual resource is not allocated. FIG. 15 shows that the constant load pattern, periodic load pattern, gradually-increasing load pattern, and irregular load pattern are to be allocated to Host B, Host C, Host D, and Host E, respectively, and that the period of the periodic load pattern for Host C is 60 minutes.

FIG. 16 shows a host CPU allocation amount management table 1600 serving as information for managing an allocation situation of the physical computing resource with respect to the virtual computing resource for each predetermined time interval (every 5 minutes in the example of FIG. 16).

The host CPU allocation amount management table 1600 is stored in the schedule DB 202.

The host CPU allocation amount management table 1600 includes a column 1601 indicating an ID serving as information for identifying allocation information, a column 1602 indicating a time slot holding a start time for each predetermined time interval, a column 1603 indicating the host ID serving as the identification information on the physical computing resource to be managed, a column 1604 indicating a utilization amount of the CPU of the host computer within the time slot 1602, and a column 1605 indicating an available CPU capacity, which are saved in association with one another.

The information managed by the host CPU allocation amount management table 1600 may be saved to a file or the like on the management server 100 instead of the schedule DB 202.

Figure 17:
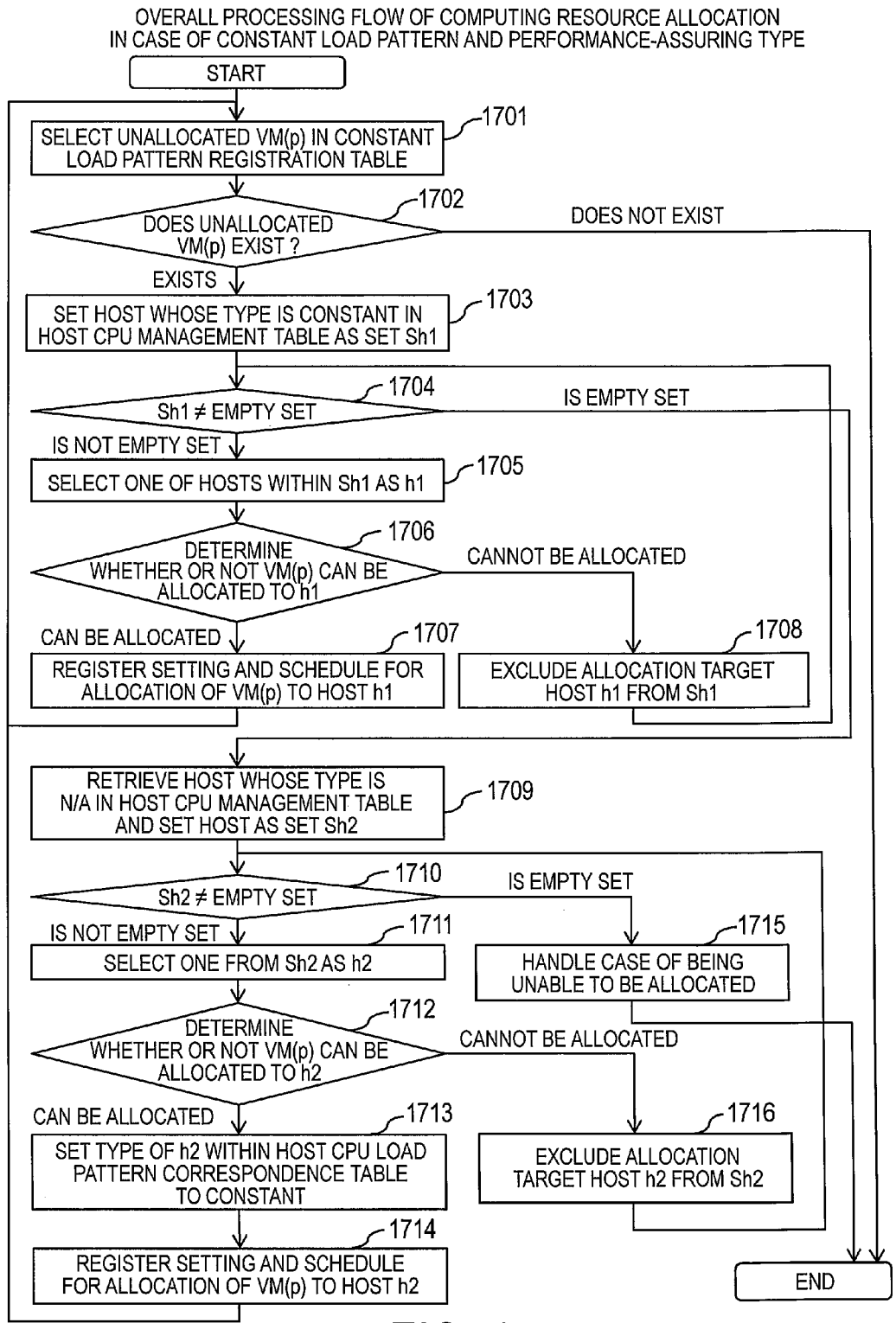
FIG. 17 is a processing flow of creating a computing resource allocation schedule in a case of the constant load pattern and the performance-assuring type.

FIG. 17 is a processing flow of the allocation to the host computer in a case where the target VM group is "constant" with the performance condition 1306 being "performance-assuring type", which is a detailed processing flow of Step 501.

In Step 1701, an unallocated VM (which is set as "VM(p)") is selected in the constant load pattern registration table 800.

In Step 1702, it is determined whether or not the VM(p) selected in Step 1701 exists.

In Step 1703 to Step 1708, it is determined for the target VM(p) whether or not the target VM(p) can be allocated in the host computer group whose type 1502 is "constant" (Step 1706), and when the target VM(p) can be allocated, a schedule for the allocation setting is registered in the VM allocation table 1100 of the schedule DB 202 so as to allocate the VM(p) to a host computer h1 (Step 1707). A registration flow of the specific allocation setting is described later with reference to FIG. 19.

When it is determined in the determination of Step 1706 that the VM(p) cannot be allocated, the allocation target host computer h1 is excluded from a set Sh1 in Step 1708.

In Steps 1709 to 1716, it is determined for the target VM(p) whether or not the target VM(p) can be allocated to a host computer h2 to which the load pattern has not been allocated yet, in other words, whose type 1502 is "N/A" within the host CPU load pattern correspondence table 1500 of FIG. 15 (Step 1712), and when the target VM(p) can be allocated, the type of the host computer h2 within the host CPU load pattern correspondence table 1500 is updated to "constant" (Step 1713), and the allocation setting is registered in the VM allocation table 1100 of the schedule DB 202 so that the VM(p) is allocated to the host computer h2 (Step 1714). The registration flow of the schedule for the specific allocation setting is described later with reference to FIG. 19.

When it is determined in the determination of Step 1712 that the VM(p) cannot be allocated, the allocation target host computer h2 is excluded from a set Sh2 in Step 1716.

In Step 1710, when the set Sh2 of the physical computing resource whose type 1502 is "N/A" is an empty set, a preferred physical computing resource to which the allocation target VM(p) can be allocated does not exist, and hence the case of being unable to be allocated is handled, to thereby complete this processing flow.

It should be noted that means for selecting one physical computing resource that can be allocated in Step 1705 or Step 1711 and a method for a search procedure for the physical computing resource that can be allocated to the VM(p) may employ another method such as First Match for selecting a match made at first or Best Match for allocation to an optimum available capacity.

Figure 18:
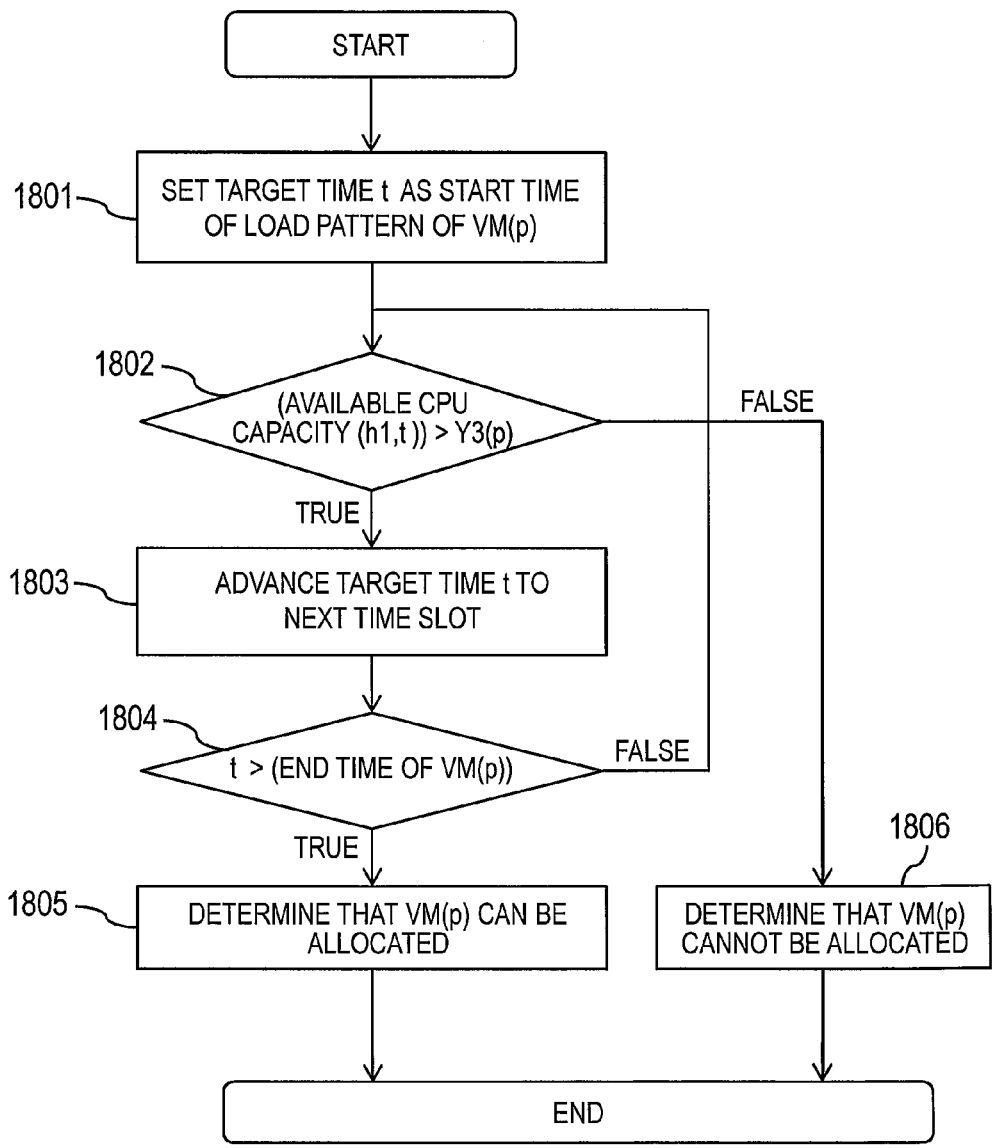
FIG. 18 is a flow of determining a computing resource allocation in the case of the constant load pattern and the performance-assuring type.

FIG. 18 is a flow of determining a computing resource allocation with respect to the VM(p) having the "constant load pattern" and the "performance-assuring type", which is a detailed flow of Step 1706 or Step 1712.

In Step 1801 to Step 1804, it is determined whether or not the allocation target VM(p) can be allocated for the time period from the start time to the end time of the load pattern thereof based on the available CPU capacity 1605 shown in FIG. 16 (Step 1802), and when the allocation target VM(p) can be allocated, the time t of the time slot 1602 of FIG. 16 is advanced to the next time slot (Step 1803). When the allocation target VM(p) cannot be allocated, it is determined that the allocation target VM(p) cannot be allocated, and the processing flow is brought to an end.

As to the determination of the possibility of the allocation conducted in Step 1802, it is determined that the allocation is possible when a fixed value Y3 of the load pattern of the VM(p) is smaller than the available CPU capacity 1605 corresponding to the host ID 1603 indicating the host computer serving as the physical computing resource of an allocation destination, and otherwise the allocation is impossible. Further, the determination of the possibility of the allocation takes the constraint management table of FIG. 14 into consideration. For example, the virtual computing resource that is already allocated to the physical computing resource is allocated so as not to violate the constraint within the constraint management table. It is determined that the virtual computing resource cannot be allocated when violating the constraint.

Figure 19:
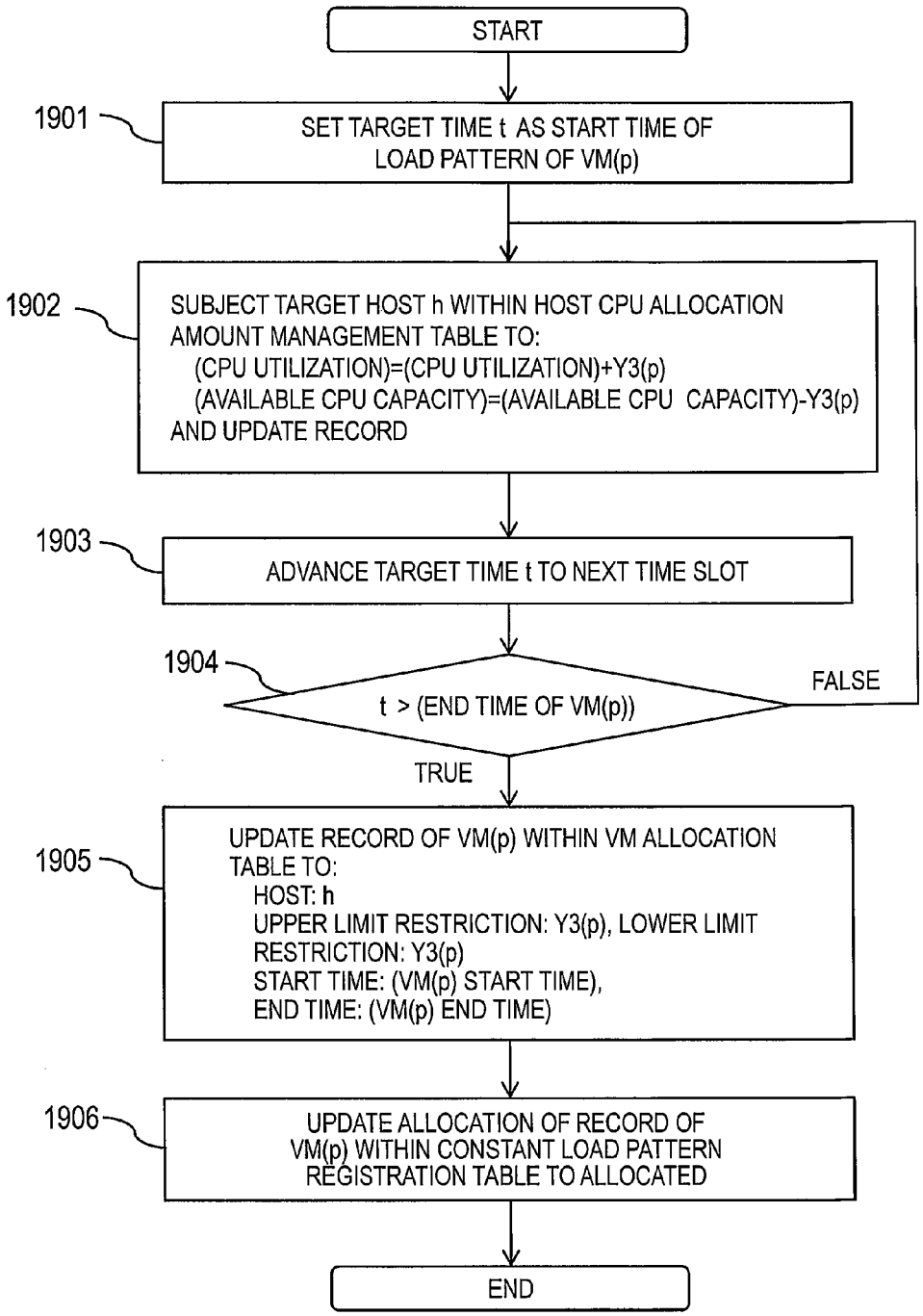
FIG. 19 is a processing flow of registering the computing resource allocation schedule in the case of the constant load pattern and the performance-assuring type.

FIG. 19 is a flow of creating and registering the schedule and the allocation setting for allocating the allocation target VM(p) to the host computer serving as the physical computing resource to which the VM(p) can be allocated, which is a detailed processing flow of Step 1707 or Step 1714.

In Step 1901 to Step 1904, processing for adding the fixed value Y3 of the load pattern of the target VM(p) to the CPU utilization 1604 managed in FIG. 16 and subtracting Y3 from the available CPU capacity 1605 (Step 1902) is updated for the time slot 1602 from the start time 805 of the load pattern of the VM(p) to the end time 806 thereof.

In Step 1905, in the VM allocation table 1100, the identification information on the allocation target VM is registered in the VM ID 1102 as information on the allocation, the host name of the host computer of the allocation destination is registered in the host name 1103 as the physical computing resource of the allocation destination, Y3(p) (value Y3 for the VM(p)) is registered in the upper limit restriction 1105 and the lower limit restriction 1106, the start time 805 of the load pattern of the VM(p) is registered in the start time 1107, and the end time 806 thereof is registered in the end time 1108.

In Step 1906, the allocation 803 of the VM(p) within a constant load pattern registration table is changed to "allocated", and this flow is brought to an end.

Figure 20:
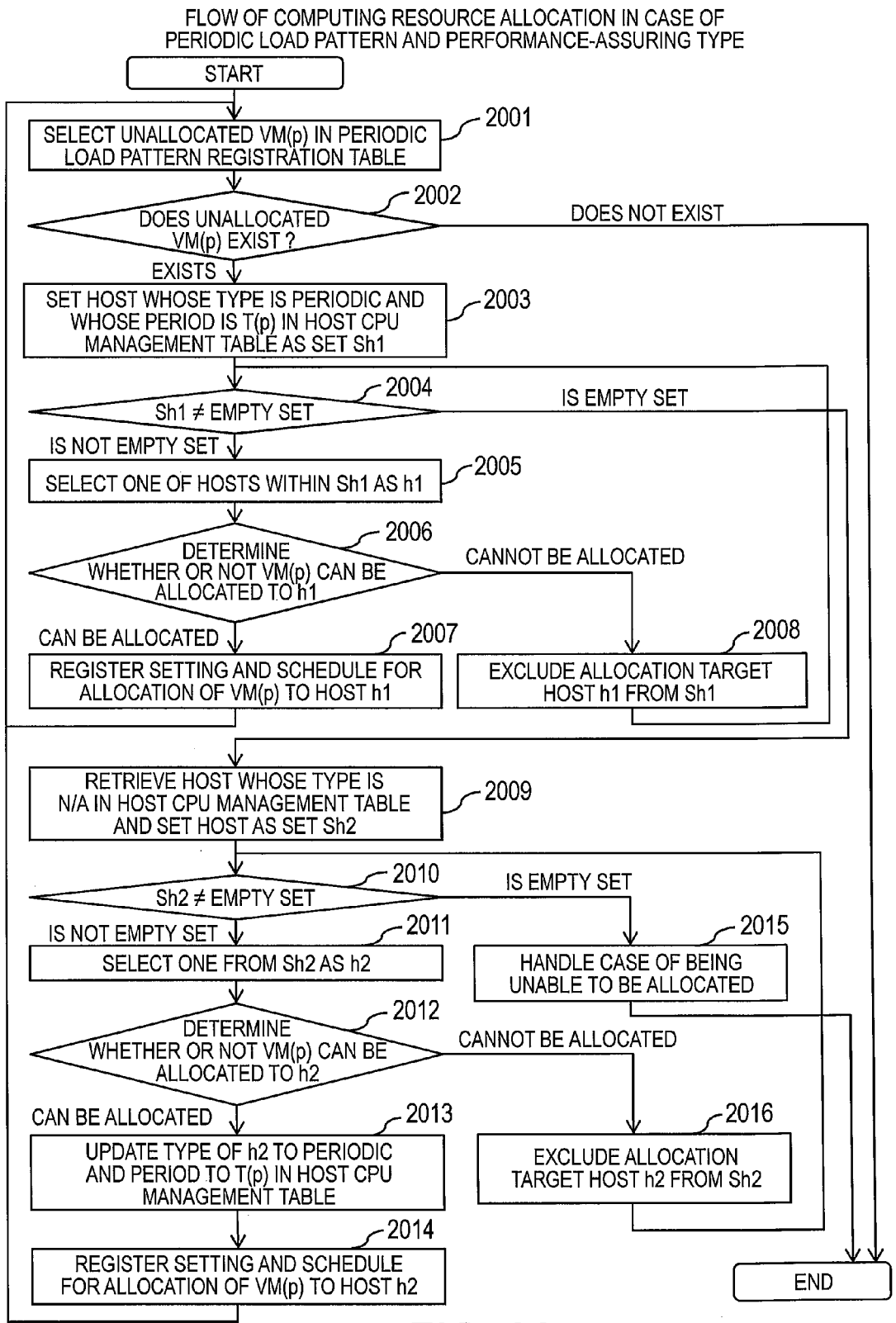
FIG. 20 is a processing flow of creating the computing resource allocation schedule in a case of the periodic load pattern and the performance-assuring type.

FIG. 20 illustrates a processing flow of the allocation to the host computer in a case where the target VM group is "periodic" with the performance condition 1306 being "performance-assuring type", which is a detailed processing flow of Step 502.

In Step 2001, an unallocated VM (which is set as "VM (p)") is selected in the periodic load pattern registration table 700.

In Step 2002, it is determined whether or not the VM(p) selected in Step 2001 exists.

In Step 2003 to Step 2008, it is determined for the target VM(p) whether or not the target VM(p) can be allocated in the host computer group whose type 1502 is "periodic" and whose period 1503 has the same value as that of T706 of the VM(p) in the periodic load pattern registration table (Step 2006). When the target VM(p) can be allocated, a schedule for the allocation setting is registered in the VM allocation table 1100 of the schedule DB 202 so as to allocate the VM(p) to a host computer h1 (Step 2007). A registration flow of the specific allocation setting is described later with reference to FIG. 22.

When it is determined in the determination of Step 2006 that the VM(p) cannot be allocated, the host computer h1 is excluded from an allocation target set Sh1 in Step 2008.

In Steps 2009 to 2016, it is determined for the target VM(p) whether or not the target VM(p) can be allocated to a host computer h2 to which the load pattern has not been allocated yet, in other words, whose type 1502 is "N/A" within the host CPU load pattern correspondence table 1500 (Step 2012), and when the target VM(p) can be allocated, the type 1502 of the host computer h2 within the host CPU load pattern correspondence table 1500 is updated to "periodic", the period 1503 is updated to the value T(p) of T706 that indicates the period of the VM(p) in the periodic load pattern registration table 700 (Step 2013), and the allocation setting is registered in the VM allocation table 1100 of the schedule DB 202 so that the VM(p) is allocated to the host computer h2 (Step 2014). The registration flow of the schedule for the specific allocation setting is described later with reference to FIG. 22.

When it is determined in the determination of Step 2012 that the VM(p) cannot be allocated, the allocation target host computer h2 is excluded from the set Sh2 in Step 2016.

In Step 2010, when the set Sh2 of the physical computing resource whose type 1502 is "N/A" in the host CPU load pattern correspondence table of FIG. 15 is an empty set, a preferred physical computing resource to which the allocation target VM(p) can be allocated does not exist, and hence the case of being unable to be allocated is handled, to thereby complete this processing flow.

It should be noted that means for selecting one physical computing resource that can be allocated in Step 2005 or Step 2011 and a method for a search procedure for the physical computing resource that can be allocated to the VM(p) may employ another method such as First Match for selecting a match made at first or Best Match for allocation to an optimum available capacity.

Figure 21:
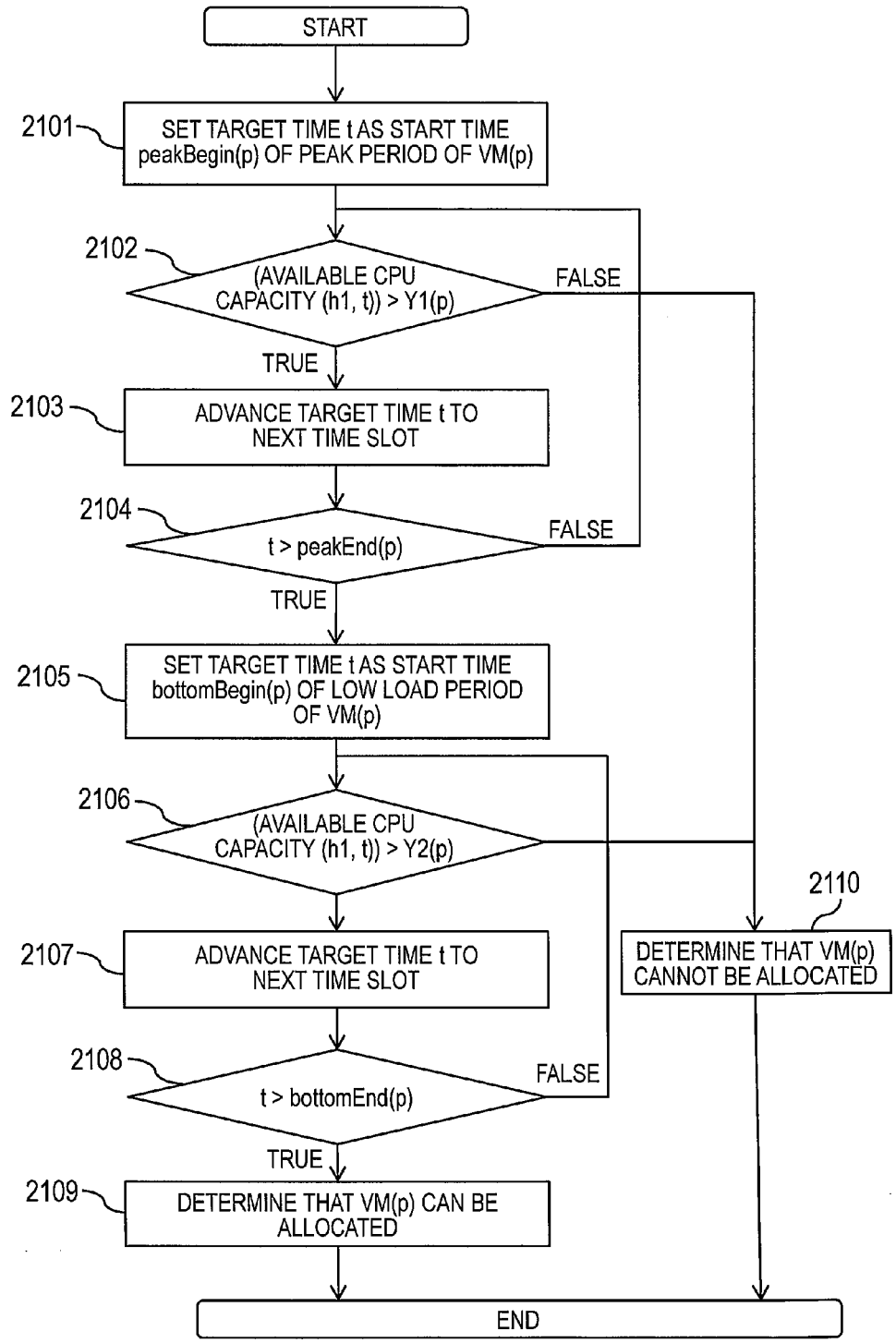
FIG. 21 is a flow of determining the computing resource allocation in the case of the periodic load pattern and the performance-assuring type.

FIG. 21 is a flow of determining a computing resource allocation with respect to the VM(p) having the "periodic load pattern" and the "performance-assuring type", which is a detailed flow of Step 2006 or Step 2012.

In Step 2101 to Step 2104, it is determined whether or not the allocation target VM(p) can be allocated for the time period from the start time peakBegin(p) to the end time peakEnd(p), which is the first peak period of the load pattern thereof, based on the available CPU capacity 1605 (Step 2102), and when the allocation target VM(p) can be allocated, the time slot 1602 of the CPU allocation amount management table 1600 is advanced to the next time slot (Step 2103). When the allocation target VM(p) cannot be allocated, it is determined that the allocation target VM(p) cannot be allocated, and the processing flow is brought to an end.

In Step 2105 to Step 2110, it is determined whether or not the allocation target VM(p) can be allocated for the time period from, the start time bottomBegin(p) to the end time bottomEnd(p), which is the first low-load period of the load pattern thereof, based on the available CPU capacity 1605 indicating the CPU availability of the host computer (Step 2106), and when the allocation target VM(p) can be allocated, the time t of the time slot 1602 of FIG. 16 is advanced to the next time slot (Step 2107). When the allocation target VM(p) cannot be allocated, it is determined that the allocation target VM(p) cannot be allocated, and the processing flow is brought to an end (Step 2110).

As to the determination of the possibility of the allocation conducted in Step 2102 and Step 2106, it is determined that the allocation is possible when the available CPU capacity 1605 of FIG. 16 is larger than a peak value Y1 of the load pattern of the VM(p), and otherwise the allocation is impossible. Further, the determination of the possibility of the allocation takes the constraint management table of FIG. 14 into consideration. For example, the virtual computing resource that is already allocated to the physical computing resource is allocated so as not to violate the constraint within the constraint management table. It is determined that the virtual computing resource cannot be allocated when violating the constraint (Step 2110).

Figure 22:
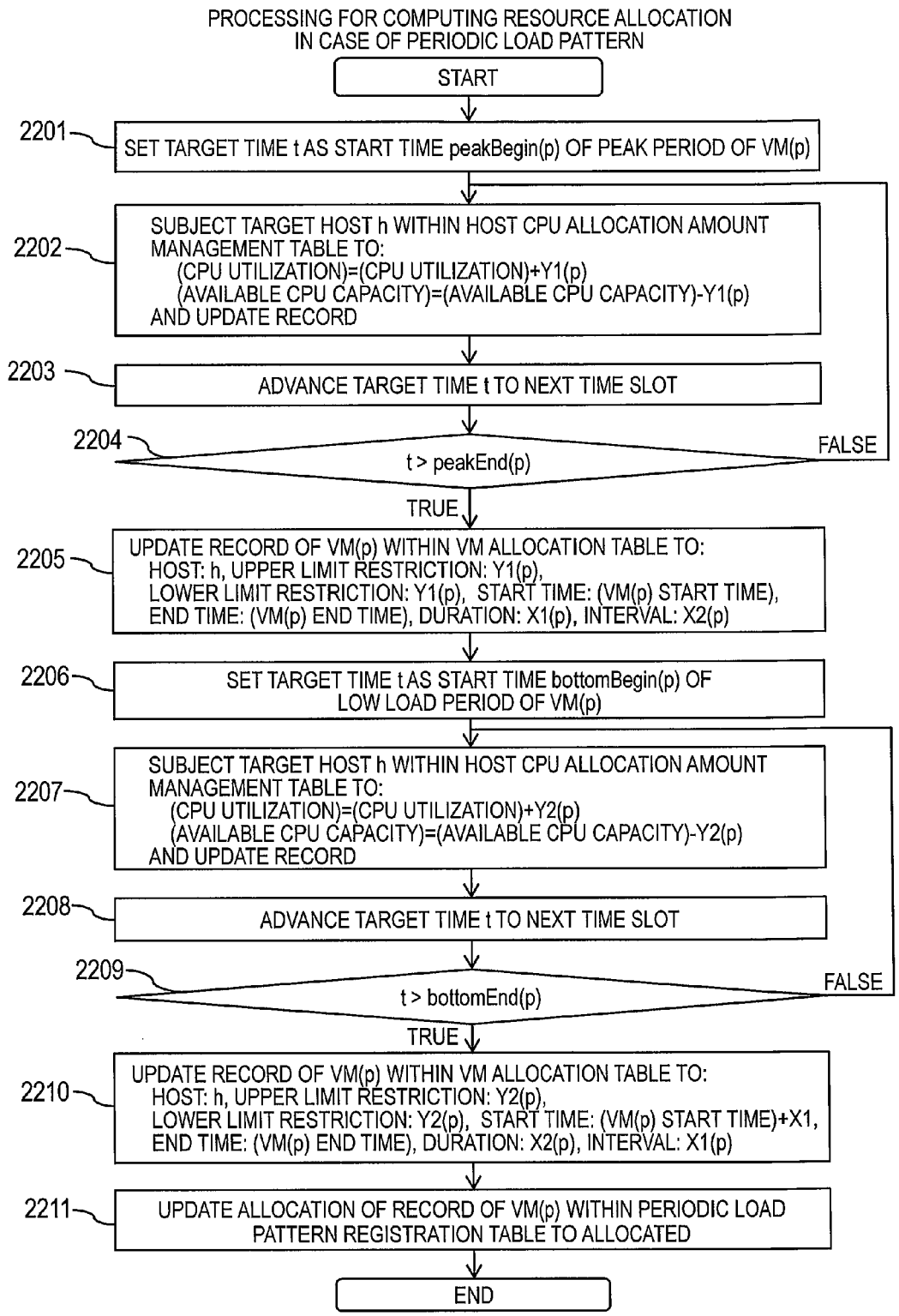
FIG. 22 is a processing flow of registering the computing resource allocation schedule in the case of the periodic load pattern and the performance-assuring type.

FIG. 22 is a flow of creating and registering the schedule and the allocation setting for allocating the allocation target VM(p) to the host computer serving as the physical computing resource to which the VM(p) can be allocated, which is a detailed processing flow of Step 2007 or Step 2014 in FIG. 20.

In Step 2201 to Step 2204, processing for updating the allocation situation of the physical computing resource managed in FIG. 16 is carried out. For example, the CPU utilization 1604 serving as the utilization amount of the CPU of the host computer is updated to a value obtained by adding Y1 of the load pattern of the target VM(p) thereto, and the available CPU capacity 1605 is updated to a value obtained by subtracting Y1 therefrom (Step 2202).

The processing is carried out in regard to the time slot 1602 of the host CPU allocation amount management table of FIG. 16 from a start time peakBegin(p) (which is equal to the start time 709) of the first peak period starting at the start time 709 relating to the VM(p) of the periodic load pattern registration table 700 to an end time peakEnd(p) (which is a time obtained by adding the value X1 to the start time 709) of the first peak period.

In Step 2205, in regard to the VM(p) within the VM allocation table 1100, the host name indicating the host computer is registered in the host 1103, a peak value $Y1(p)$ is registered in the upper limit restriction 1105 and the lower limit restriction 1106, the start time 709 of the VM(p) within the periodic load pattern registration table 700 is registered in the start time 1107, the end time 710 is registered in the end time 1108, $X1(p)$ is registered in the duration 1109, and $X2(p)$ is registered in the interval 1110.

The processing of Step 2206 to Step 2209 indicate processing for updating the allocation situation of the physical computing resource managed in FIG. 16. For example, the CPU utilization 1604 indicating the utilization amount of the CPU of the host computer is updated to the value obtained by adding Y2 of the load pattern of the target VM(p) thereto, and the available CPU capacity 1605 is updated to the value obtained by subtracting Y2 therefrom (Step 2207).

This processing is carried out in regard to the time slot 1602 of the host CPU allocation amount management table of FIG. 16 from a start time bottomBegin(p) (which is equal to peakEnd(p)) of a first low-load period starting at the start time 709 relating to the VM(p) of the periodic load pattern registration table 700 to the end time bottomEnd(p) (which is a time obtained by adding the value X2 to bottomBegin (p)) of the first low-load period.

In Step 2210, in regard to the VM(p) within the VM allocation table 1100, the host 1103 is registered as the host name indicating the host computer, the upper limit restriction 1105 and the lower limit restriction 1106 are both registered as the value $Y2(p)$ at the low-load time, the start time 1107 is registered as a time obtained by adding $X1(p)$ to the start time 709 of the VM(p) within the periodic load pattern registration table 700, the end time 1108 is registered as the end time 710, the duration 1109 is registered as $X2(p)$, and the interval 1110 is registered as $X1(p)$. In Step 2211, the allocation 703 of the VM(p) within a periodic load pattern registration table is changed to "allocated", and this flow is brought to an end.

Figure 23:
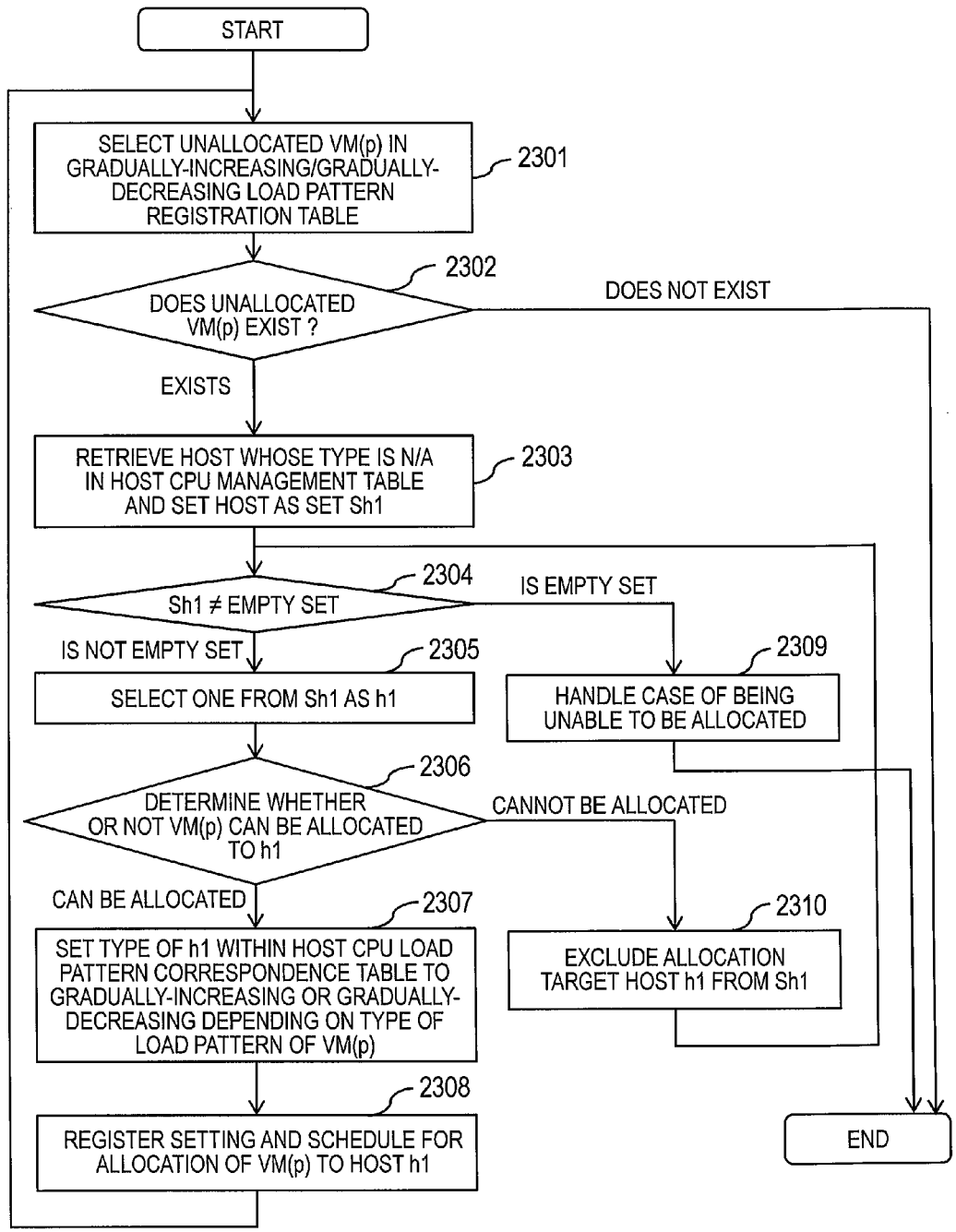
FIG. 23 is a processing flow of creating the computing resource allocation schedule in a case of a gradually-increasing or gradually-decreasing load pattern and the performance-assuring type.

FIG. 23 is a flow of processing the allocation of the VM(p) whose target VM group is "gradually-increasing" or "gradually-decreasing" and whose performance condition 1306 is "performance-assuring type" with respect to the host computer, which is a detailed flow of Step 503 within FIG. 5.

In Step 2301, the unallocated VM (which is set as "VM(p)") is selected in the gradually-increasing/gradually-decreasing load pattern registration table 900.

In Step 2302, it is determined whether or not the VM(p) selected in Step 2301 exists.

In Steps 2301 to 2310, it is determined for the target VM(p) whether or not the target VM(p) can be allocated to a host computer h1 to which the load pattern has not been allocated yet, in other words, whose type 1502 is "N/A" within the host CPU load pattern correspondence table 1500 (Step 2306), and when the target VM(p) can be allocated, the type of the host computer h1 is updated to "gradually-increasing" or "gradually-decreasing" depending on the type of the VM(p) within the gradually-increasing/gradually-decreasing load pattern registration table 900 (Step 2307), and the allocation setting is registered in the VM allocation table 1100 of the schedule DB 202 so as to allocate the VM(p) to the host computer h1 (Step 2308). The registration flow of the schedule for the specific allocation setting is described later with reference to FIG. 25.

When it is determined in the determination of Step 2306 that the VM(p) cannot be allocated, the physical computing resource h1 of the allocation target is excluded from the set Sh1 in Step 2310.

In Step 2304, when the set Sh1 of the physical computing resources whose type 1502 is "N/A" is an empty set, a preferred physical computing resource to which the allocation target VM(p) can be allocated does not exist, and hence the case of being unable to be allocated is handled (Step 2309), to thereby complete this processing flow.

It should be noted that means for selecting one physical computing resource that can be allocated in Step 2305 and a method for a search procedure for the physical computing resource that can be allocated to the VM(p) may employ another method such as First Match for selecting a match made at first or Best Match for allocation to an optimum available capacity.

Figure 24:
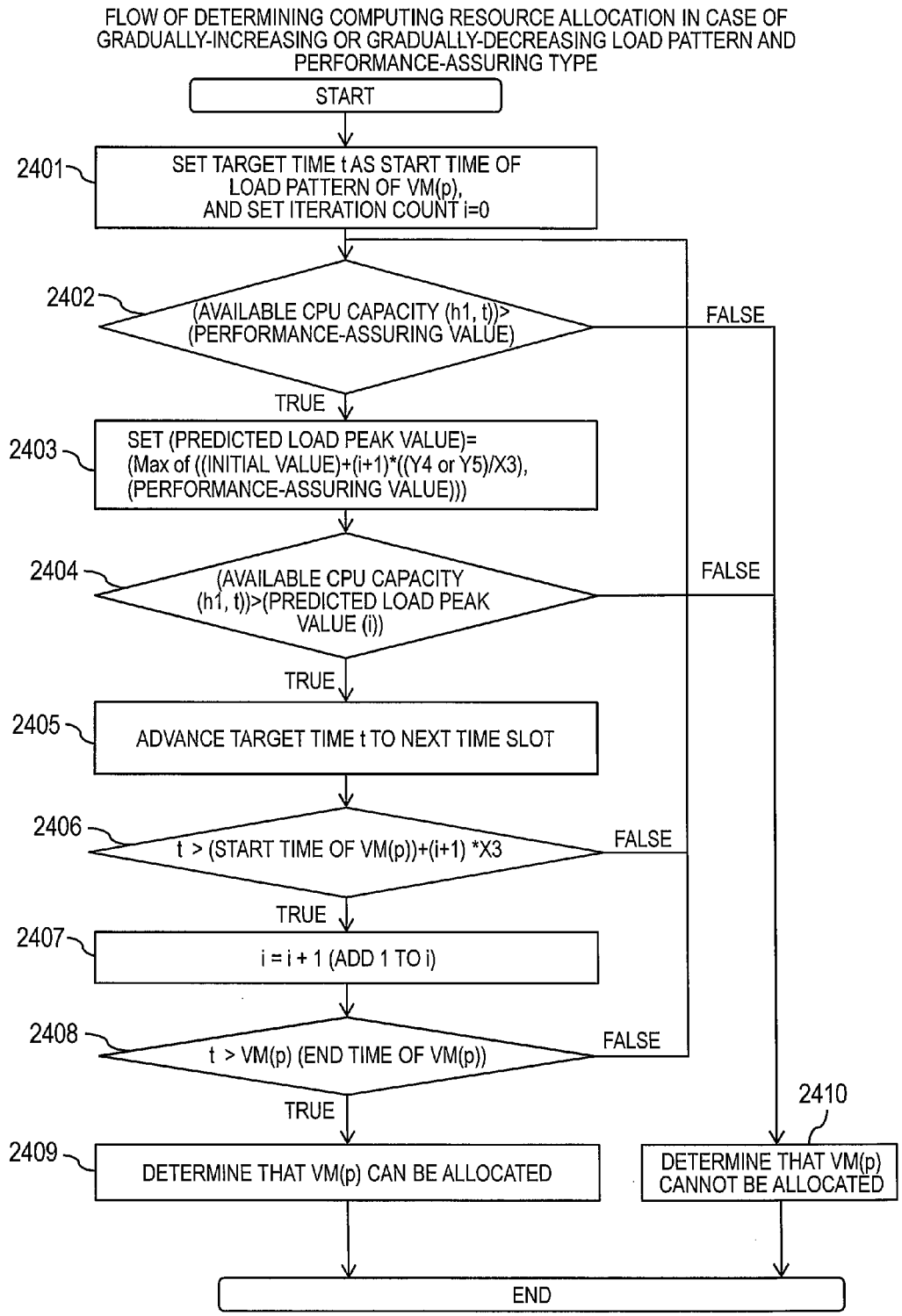
FIG. 24 is a flow of determining the computing resource allocation in the case of the gradually-increasing or gradually-decreasing load pattern and the performance-assuring type.

FIG. 24 is the flow of determining the computing resource allocation with respect to the VM(p) having the "gradually-increasing/gradually-decreasing load patterns" and the "performance-assuring type", which is a detailed processing flow of Step 2306.

Step 2401 is an initialization step for setting the target time to the start time 907 within a gradually-increasing/gradually-decreasing load pattern registration table of the VM(p), and initializes a variable i indicating an iteration count for the subsequent processing flow to zero.

In Steps 2402 to 2406, in regard to a target time t included in a fixed period X3 within the gradually-increasing/gradually-decreasing load pattern registration table of the VM(p), it is determined whether or not the available CPU capacity 1605 of FIG. 16 is smaller than a performance-assuring value of the VM(p) defined by the contract (Step 2402), and when the available CPU capacity 1605 is larger, the predicted value of the peak load within the targeted time slot is obtained from Y4 that is expected to increase during the fixed period X3 or Y5 that is expected to increase during the fixed period X3 by the calculation of Step 2403 (Step 2403), and is compared with the available CPU capacity 1605 (Step 2404), to thereby determine the possibility of the allocation.

In Step 2407, the target time t exceeds a width of the fixed period X3, the variable i indicating the iteration count is incremented by one in order to recalculate the predicted value of the peak load.

In Step 2408, the target time t is compared with the end time 908 within the gradually-increasing/gradually-decreasing load pattern registration table of the VM(p), and when the target time t is larger than the end time 908, it is determined that the allocation is possible (Step 2409), to thereby complete this processing flow. On the other hand, when the target time t is smaller than the end time 908 in Step 2408, the procedure returns to Step 2402 to carry out processing for recalculating the predicted value of the peak load, and the possibility of the allocation is determined in comparison with the available CPU capacity 1605. Further, the determination of the possibility of the allocation takes the constraint management table of FIG. 14 into consideration. For example, the virtual computing resource that is already allocated to the physical computing resource is allocated so as not to violate the constraint within the constraint management table. It is determined that the virtual computing resource cannot be allocated when violating the constraint.

Figure 25:
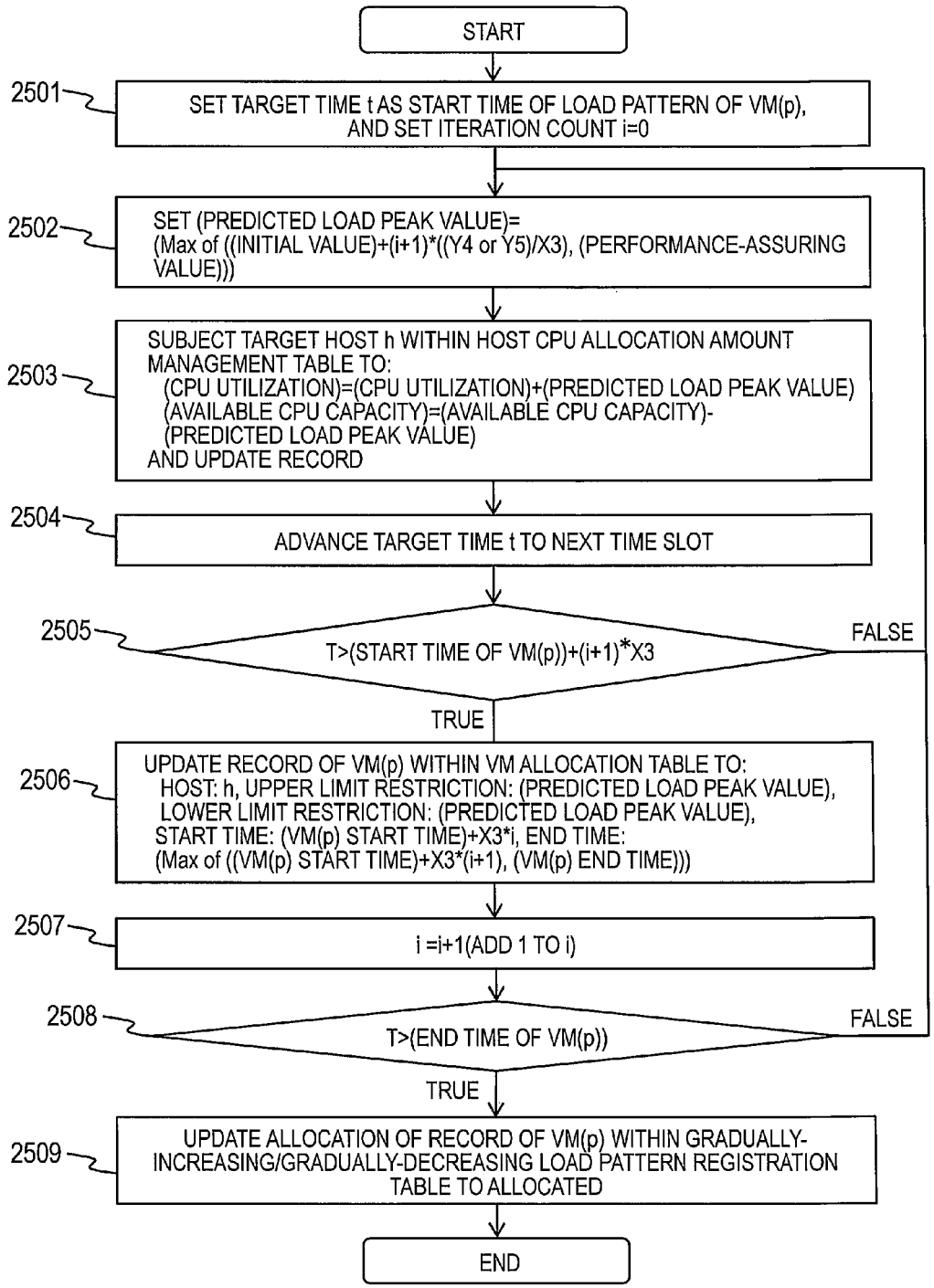
FIG. 25 is a processing flow of registering the computing resource allocation schedule in the case of the gradually-increasing or gradually-decreasing load pattern and the performance-assuring type

FIG. 25 is a processing flow of creating and registering the schedule and the allocation setting for allocating the allocation target VM(p) to the host computer serving as the physical computing resource to which the VM(p) can be allocated, which is a detailed processing flow of Step 2308.

In Step 2501, the target time is set to t, and the variable i for counting the iteration is set to zero.

In Step 2502, in regard to a predicted load obtained after the lapse of X3 from the time t in "gradually-increasing" of FIG. 6C or "gradually-decreasing" of FIG. 6D, with the initial value set to the value of the load obtained at a time after the further lapse of i*X3 from the start time of the load pattern of the VM(p), a comparison is made between a value obtained by adding thereto an increment of the load after the lapse of X3 and a value designated as the performance-assuring value, and the larger one is set as the predicted load peak value.

In Step 2503, the record of the time slot 1602 of FIG. 16 is updated by adding the predicted load peak value calculated for the target VM(p) in Step 2502 to the CPU utilization 1604 of FIG. 16 and subtracting the predicted load peak value from the available CPU capacity 1605.

In Step 2504, the target time t is advanced to the time indicated in the next record of the time slot 1602 of FIG. 16.

In Step 2505, the procedure advances to Step 2502 when the target time t precedes a time after the lapse of (i+1)*X3 from the start time of the VM(p), and advances to Step 2503 when the target time t succeeds the above-mentioned time.

In Step 2503, the record of the VM(p) within the VM allocation table 1100 is updated by setting the host name to h, both the upper limit restriction and the lower limit restriction to the predicted load peak value, the start time to (VM(p) start time)+i*X3, and the end time to the smaller one of (VM(p) start time+(i−1)*X3) and the end time of the VM(p).

In Step 2507, i is incremented by one to determine whether or not the target time t is smaller than the end time of the VM(p), and the procedure returns to Step 2502 when the target time t is smaller, and advances to Step 2509 when the target time t is larger.

In Step 2509, the allocation 903 of the VM(p) of the gradually-increasing/gradually-decreasing load pattern registration table is changed to "allocated", and this flow is brought to an end.

Figure 26:
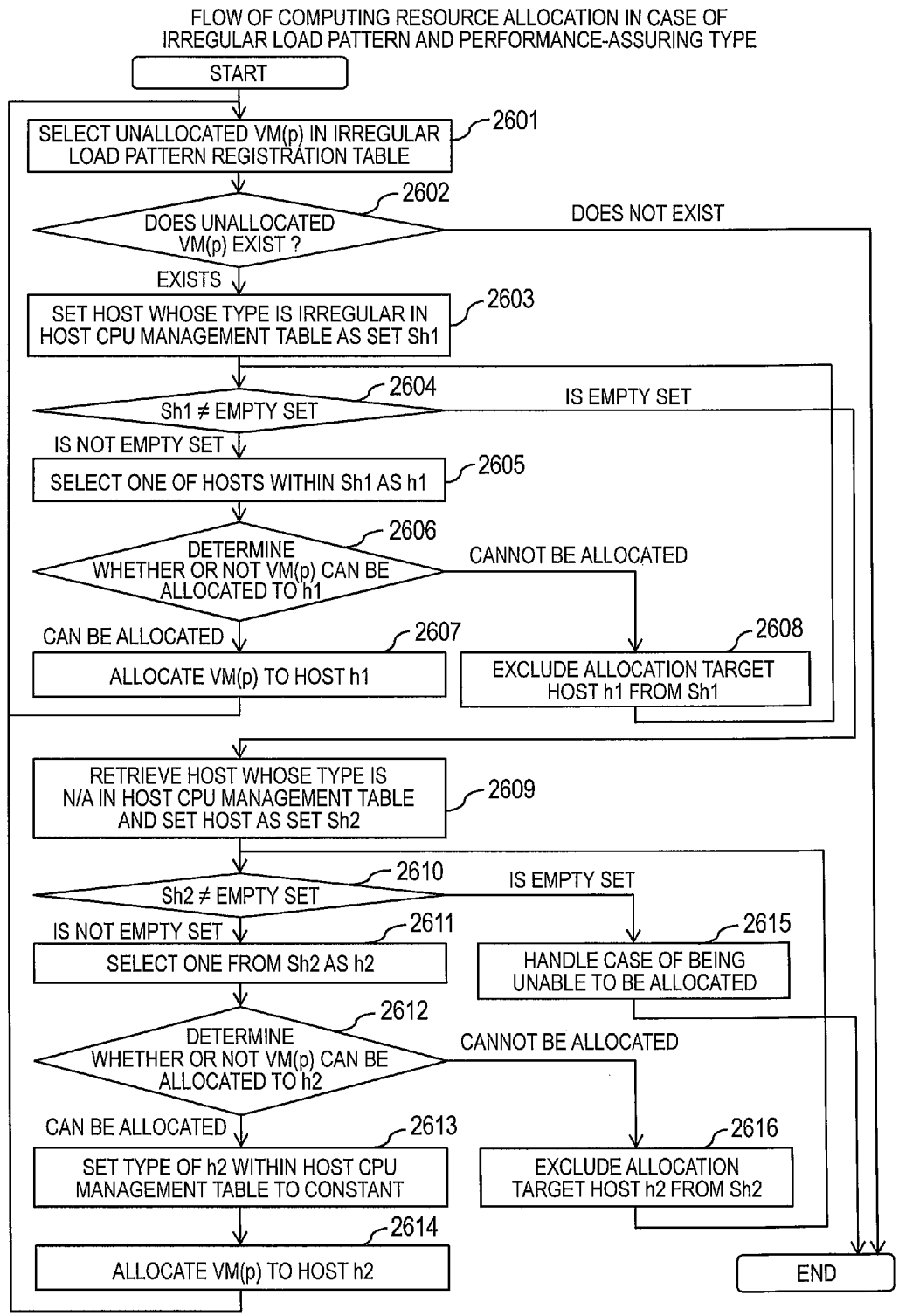
FIG. 26 is a processing flow of creating the computing resource allocation schedule in a case of the irregular load pattern and the performance-assuring type.

FIG. 26 is a flow of processing the allocation of the VM(p) whose target VM group is "irregular" and whose performance condition 1306 is "performance-assuring type" with respect to the host computer, which is a detailed flow of Step 504.

In Step 2601, the unallocated VM (which is set as "VM(p)") is selected in the irregular load pattern registration table 1000.

In Step 2602, it is determined whether or not the VM(p) selected in Step 2601 exists.

In Step 2603 to Step 2608, it is determined for the target VM(p) whether or not the target VM(p) can be allocated in the host computer group whose type 1502 is "irregular" (Step 2606), and when the target VM(p) can be allocated, the schedule for the allocation setting is registered in the VM allocation table 1100 so as to allocate the VM(p) to the host computer h1 (Step 2607). The registration flow of the specific allocation setting is described later with reference to FIG. 28.

When it is determined in the determination of Step 2606 that the VM(p) cannot be allocated, the allocation target physical computing resource h1 is excluded from the set Sh1 in Step 2608.

In Steps 2609 to 2616, in regard to the host computer h2 to which the load pattern has not been allocated yet in the host CPU load pattern correspondence table 1500, in other words, whose type 1502 is "N/A", it is determined for the target VM(p) whether or not the target VM(p) can be allocated (Step 2612), and when the target VM(p) can be allocated, the type of the host computer h2 within the host CPU load pattern correspondence table 1500 is updated to "irregular" (Step 2613), and the allocation setting is registered in the VM allocation table 1100 so as to allocate the VM(p) to the host computer h2 (Step 2614). The registration flow of the schedule for the specific allocation setting is described later with reference to FIG. 28.

When it is determined in the determination of Step 2612 that the VM(p) cannot be allocated, the allocation target host computer h2 is excluded from the set Sh2 in Step 2616.

In Step 2610, when the set Sh2 of the physical computing resources whose type 1502 within the host CPU load pattern correspondence table is "N/A" is an empty set, a preferred physical computing resource to which the allocation target VM(p) can be allocated does not exist, and hence the case of being unable to be allocated is handled, to thereby complete this processing flow.

It should be noted that means for selecting one physical computing resource that can be allocated in Step 2605 or Step 2611 and a method for a search procedure for the physical computing resource that can be allocated to the VM(p) may employ another method such as First Match for selecting a match made at first or Best Match for allocation to an optimum available capacity.

Figure 27:
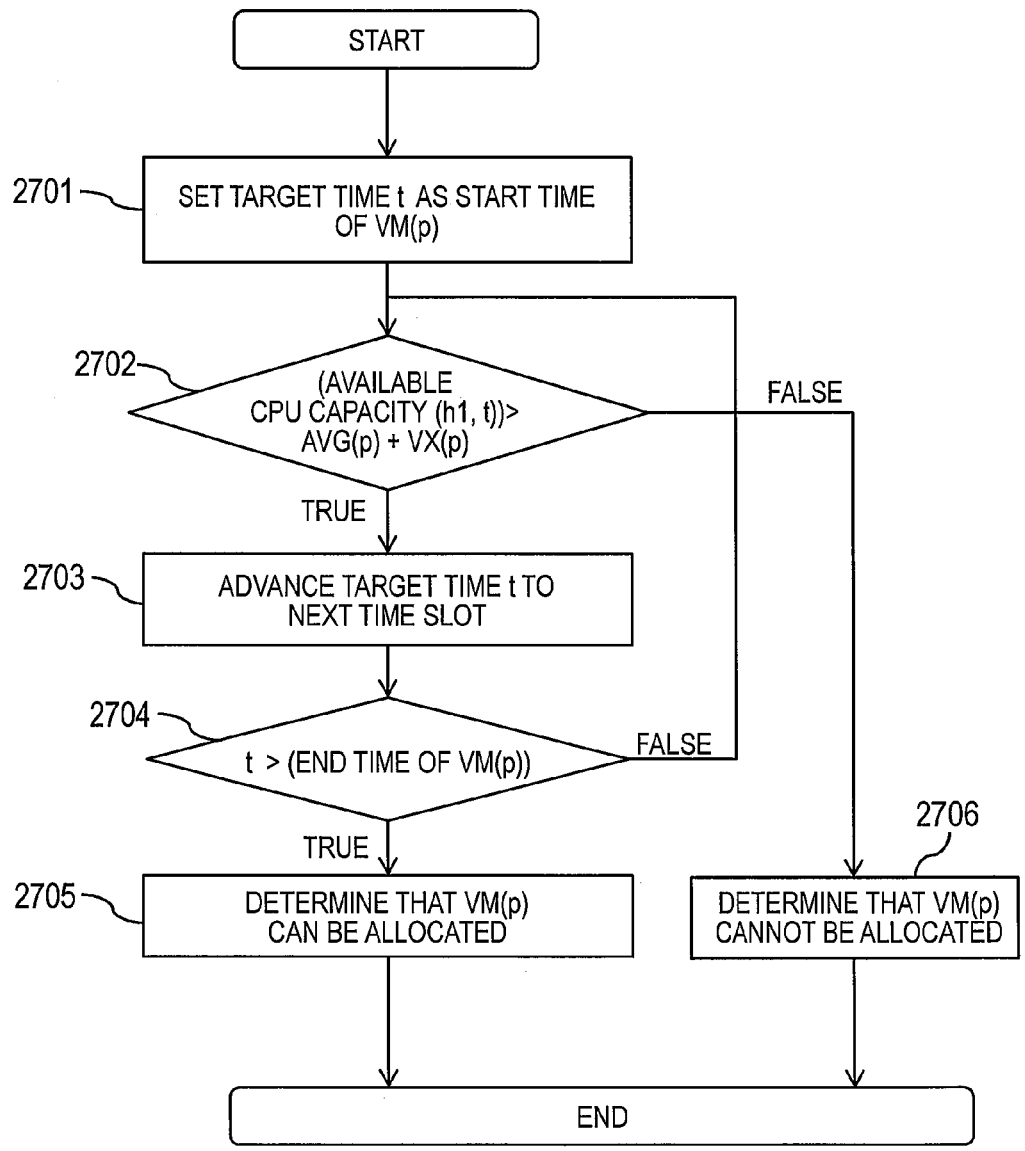
FIG. 27 is a flow of determining the computing resource allocation in the case of the irregular load pattern and the performance-assuring type.

FIG. 27 is the flow of determining the computing resource allocation with respect to the VM(p) having the "irregular load pattern" and the "performance-assuring type", which is a detailed processing flow of Step 2606 or Step 2612.

In Step 2701 to Step 2704, it is determined whether or not the allocation target VM(p) can be allocated for the time period from the start time to the end time of the load pattern thereof based on the available CPU capacity 1605 (Step 2702), and when the allocation target VM(p) can be allocated, the time t of the time slot 1602 is advanced to the next time slot (Step 2703).

When the allocation target VM(p) cannot be allocated, it is determined that the allocation target VM(p) cannot be allocated (Step 2706), and the processing flow is brought to an end.

As to the determination of the possibility of the allocation conducted in Step 2702, it is determined that the allocation is possible when the available CPU capacity 1605 of the host computer associated with the host ID 1603 is larger than a sum of an average value AVG(p) of the load pattern of the VM(p) and a numerical value VX(p) indicating the spread of the dispersion from the average value, and otherwise the allocation is impossible. Further, the determination of the possibility of the allocation takes the constraint management table of FIG. 14 into consideration. For example, the virtual computing resource that is already allocated to the physical computing resource is allocated so as not to violate the constraint within the constraint management table. It is determined that the allocation target VM(p) cannot be allocated when violating the constraint.

Figure 28:
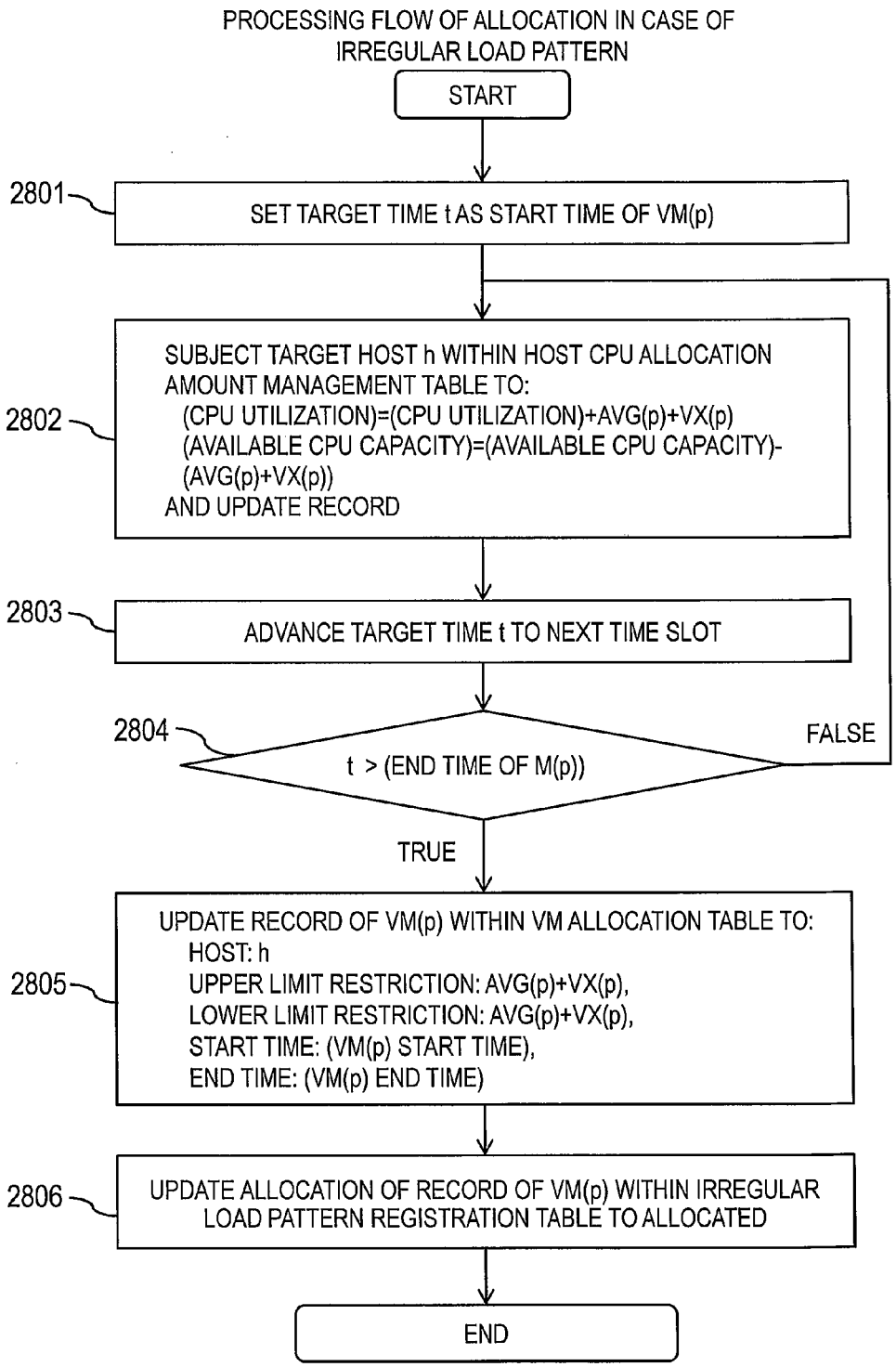
FIG. 28 is a processing flow of registering the computing resource allocation schedule in the case of the irregular load pattern and the performance-assuring type.

FIG. 28 is a processing flow of creating and registering the schedule and the allocation setting for allocating the allocation target VM(p) to the host computer, which is a detailed processing flow of Step 2607 or Step 2614.

In Step 2801 to Step 2804, the CPU utilization 1604 indicating the utilization amount of the CPU of the host computer is updated to a value obtained by adding thereto the sum of the average value AVG(p) of the load pattern of the target VM(p) and the numerical value VX(p) indicating the spread of the dispersion from the average, and the available CPU capacity 1605 is updated to a value obtained by subtracting therefrom the sum of the average value AVG(p) and the numerical value VX(p) indicating the spread of the dispersion from the average (Step 2802). This processing is carried out for the update in regard to the time slot 1602 of the host CPU allocation amount management table of FIG. 16 for the time period from the start time 1006 of the load pattern of the VM(p) to the end time 1007.

In Step 2805, in regard to the VM(p) within the VM allocation table 1100, the identification information on the allocation target VM is registered in the VM ID 1102, the host name of the host computer of the allocation destination is registered in the host name 1103, AVG(p)+VX(p) (value Y3 for the VM(p)) is registered in the upper limit restriction 1105 and the lower limit restriction 1106, the start time 1006 of the VM(p) is registered in the start time 1107, and the end time 1007 is registered in the end time 1108.

In Step 2806, the allocation 1003 of the VM(p) within an irregular load pattern registration table is changed to "allocated", and this flow is brought to an end.

Figure 29:
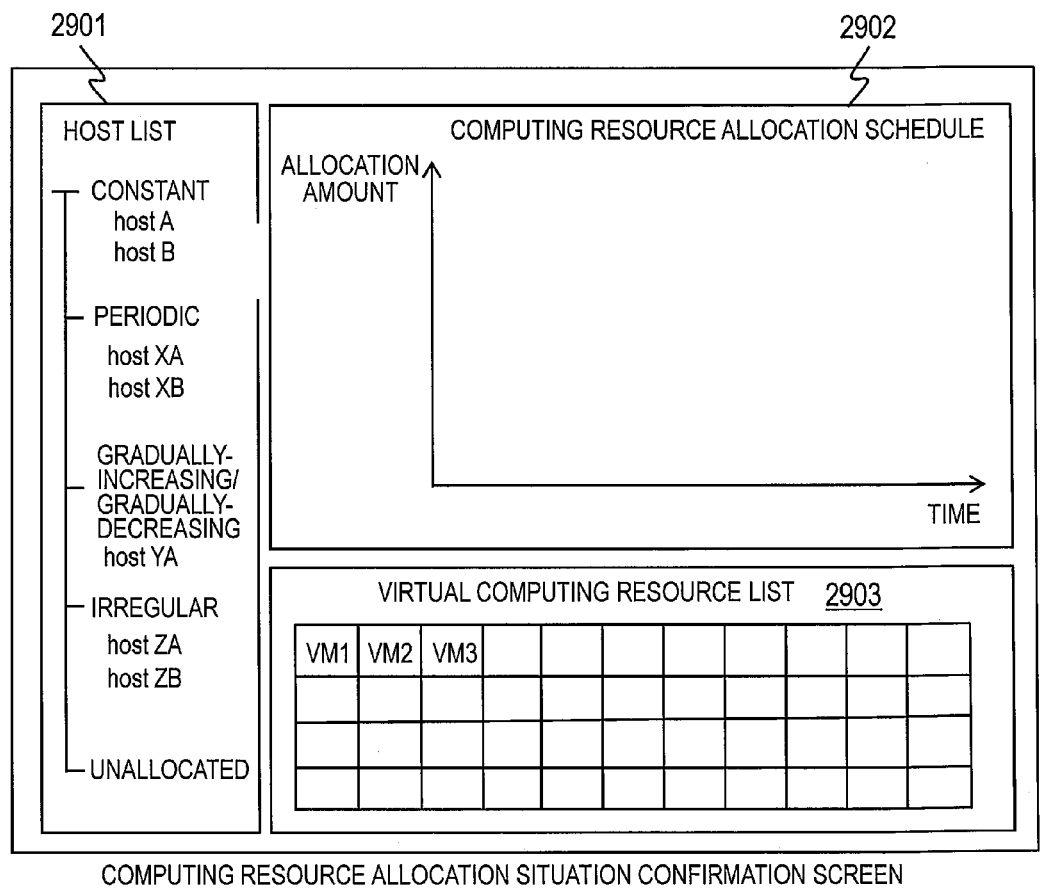
FIG. 29 is an example of a computing resource allocation situation confirmation screen.

FIG. 29 is an example of a computing resource allocation situation confirmation screen. The computing resource allocation situation confirmation screen includes a host list 2901, a computing resource allocation schedule 2902, and a virtual computing resource list 2903. The host list 2901 displays the host registered by the type 1502 within the host CPU load pattern correspondence table of FIG. 15 independently for each type of load pattern. In the example of FIG. 29, Host A and host B are registered as the "constant" hosts.

The computing resource allocation schedule 2902 displays a graph indicating the resource allocation amount of the host computer with respect to the VM with the lapse of time. The horizontal axis represents a time, and the vertical axis represents the resource allocation amount (for example, CPU frequency) of the host computer.

The virtual computing resource list 2903 displays a list of the VMs created on the cloud service.

FIGS. 30A to 30D show examples of a graph displayed in the computing resource allocation schedule 2902 of FIG. 29.

Figure 30A:
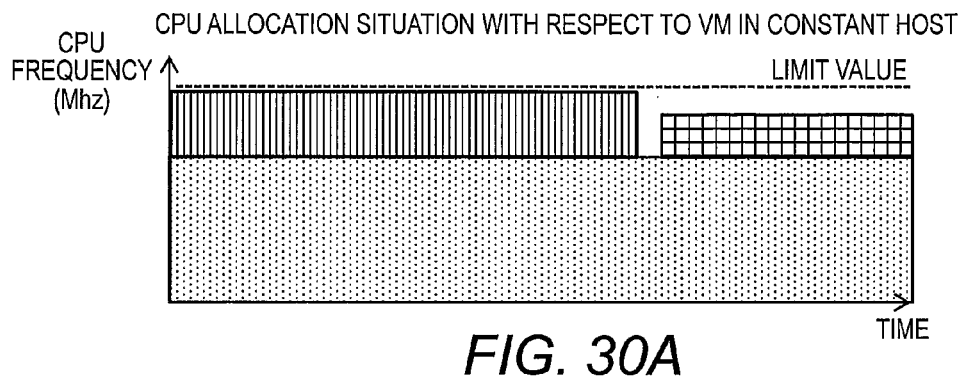
FIG. 30A is an example of a graph displayed in the computing resource allocation schedule.

FIG. 30A shows a CPU allocation situation with respect to the VM in the "constant" host, and is an example thereof displayed when an arbitrary host classified into "constant" in the host list 2901 of FIG. 29 is selected. The shaded areas each indicate an allocation amount of the CPU frequency with respect to the VM.

Figure 30B:
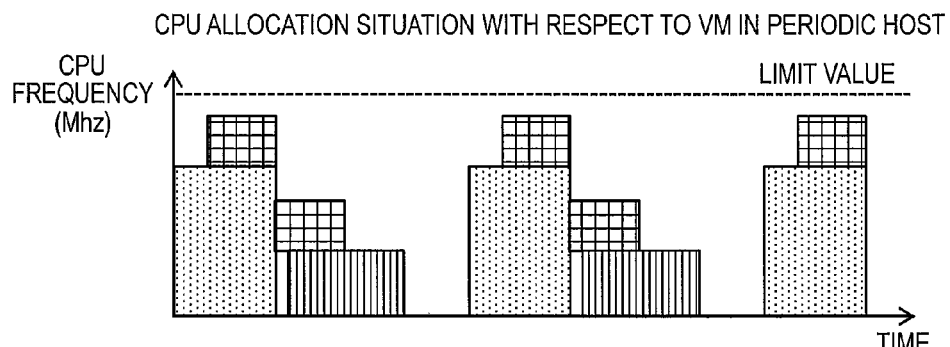
FIG. 30B is an example of a graph displayed in the computing resource allocation schedule.

FIG. 30B shows a CPU allocation situation with respect to the VM in the "periodic" host, and is an example thereof displayed when an arbitrary host classified into "periodic" in the host list 2901 of FIG. 29 is selected.

Figure 30C:
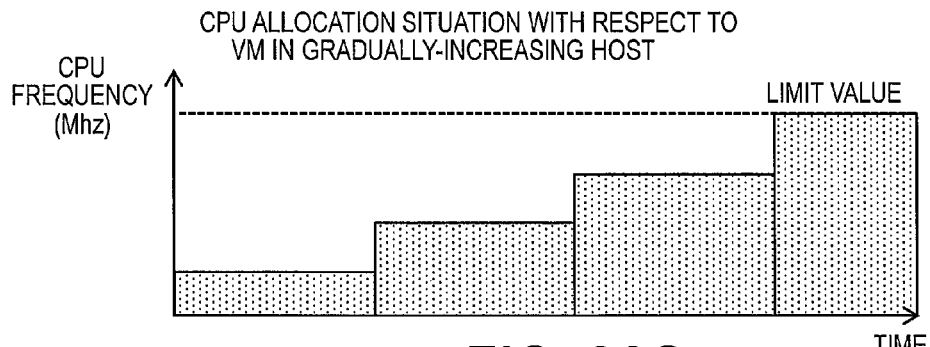
FIG. 30C is an example of a graph displayed in the computing resource allocation schedule.

FIG. 30C shows a CPU allocation situation with respect to the VM in the "gradually-increasing" host, and is an example thereof displayed when an arbitrary host classified into "gradually-increasing" in the host list 2901 of FIG. 29 is selected. It should be noted that a graph showing the CPU frequency decreasing with the lapse of time is displayed when a host classified into "gradually-increasing" is selected.

Figure 30D:
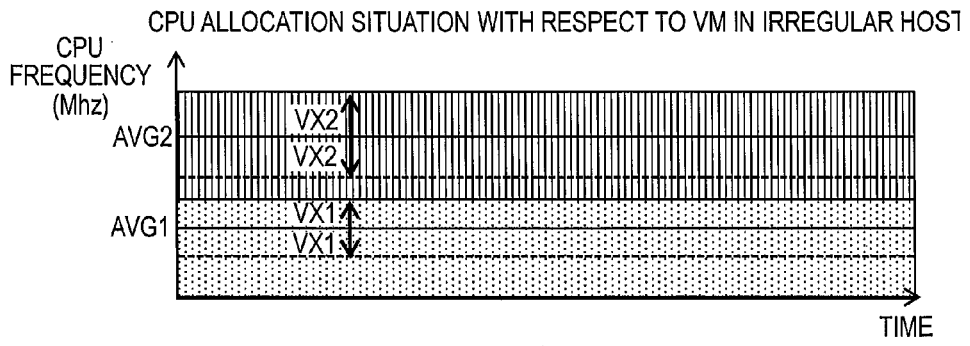
FIG. 30D is an example of a graph displayed in the computing resource allocation schedule.

FIG. 30D shows a CPU allocation situation with respect to the VM in the "irregular" host, and is an example thereof displayed when an arbitrary host classified into "irregular" in the host list 2901 of FIG. 29 is selected.

It should be noted that in this embodiment, the physical computing resource and the virtual computing resource are described as the host computer and the VM (in particular, CPU), respectively, as the targets, but a component set as the target may be a memory or a disk I/O instead of a CPU, and the same allocation processing may be carried out by replacing the above-mentioned components by a storage, a virtualized storage volume, and a component (for example, processor, memory, cache memory, port, and disk drive) within a storage apparatus.

Further, the same allocation processing may be carried out by replacing the physical computing resource and the virtual computing resource by respective components (such as virtual port and virtual network VLAN) of a physical network apparatus and a virtual network apparatus (virtual switch) that has been virtualized, respectively.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings shows control lines and information lines as considered necessary for explanations but do not show all control lines or information lines in the products. It can be considered that almost of all components are actually interconnected.

What is claimed is:

1. A method of allocating a physical computing resource of a computer system comprising a plurality of virtual machines, the method comprising:
storing, by a storage module, load information of each of the plurality of virtual machines obtained by classifying a load on each of the plurality of virtual machines into a plurality of groups depending on a load fluctuation characteristic;

predicting, by an allocation schedule creation module, the load on each of the plurality of virtual machines during a predetermined period based on the load information and a rule defined for each of the plurality of groups;

determining, for each of the plurality of groups, an allocation amount of the physical computing resource to be allocated to at least one of the plurality of virtual machines classified into the each of the plurality of groups and a time slot for allocation based on the predicted load on each of the plurality of virtual machines;

creating a schedule comprising information of the allocation amount and the time slot that has been determined;

allocating, by a schedule execution module, the physical computing resource to each of the plurality of virtual machines based on the schedule, wherein the storage module further stores setting information indicating whether or not performance of the physical computing resource to be allocated to each of the plurality of virtual machines is guaranteed and further stores a value of the guaranteed performance if performance is guaranteed, wherein the method further comprises preferentially determining, by the allocation schedule creation module, the allocation amount of the physical computing resource and the time slot for the allocation for each of the plurality of groups for the at least one of the plurality of virtual machines to guarantee the performance indicated in the setting information, wherein the storage module further stores constraint information, which is information of a physical arrangement of the plurality of virtual machines and includes information indicating whether virtual machines can and cannot share a same physical computer, wherein the method further comprises the step of determining, by the allocation schedule creation module, the plurality of virtual machines to which the same physical computer is to be allocated and the plurality of virtual machines to which different physical computers are to be allocated based on the constraint information, and wherein the schedule is created based on the determination.

2. The method of allocating the physical computing resource according to claim 1, wherein the plurality of groups comprise:
a first group into which one of the plurality of virtual machines exhibiting a load fluctuation that falls within a predetermined range during the predetermined period is classified;
a second group into which one of the plurality of virtual machines exhibiting a fluctuation of the load increasing or decreasing periodically at a predetermined period is classified;
a third group into which one of the plurality of virtual machines exhibiting a fluctuation of the load increasing or decreasing at a predetermined rate within a period of time is classified; and
a fourth group into which one of the plurality of virtual machines exhibiting a fluctuation of the load changing irregularly is classified.

3. The method of allocating the physical computing resource according to claim 2, wherein the physical computing resource comprises a CPU of the physical computer; and wherein the allocation schedule creation module allocates the CPU of the physical computer that differs depending on each of the plurality of groups to the at least one of the plurality of virtual machines classified into the first group to the fourth group.

4. A control system for controlling allocation of a physical computing resource with respect to a plurality of virtual machines, comprising:
a storage module storing load information of each of the plurality of virtual machines obtained by classifying a load of each of the plurality of virtual machines into a plurality of groups depending on a load fluctuation characteristic;
a memory connected to a processor storing instructions that when executed by the processor cause the processor to: execute prediction processing of the load on each of the plurality of virtual machines during a predetermined period based on the load information and a rule defined for each of the plurality of groups, determine, for each of the plurality of groups, an allocation amount of the physical computing resource to be allocated to at least one of the plurality of virtual machines classified into the each of the plurality of groups and a time slot for allocation based on the predicted load on each of the plurality of virtual machines, and create a schedule comprising information of the allocation amount and the time slot that has been determined, and allocate the physical computing resource to each of the plurality of virtual machines based on the schedule, wherein the storage module further stores setting information indicating whether or not performance of the physical computing resource to be allocated to each of the plurality of virtual machines is guaranteed and further stores a value of the guaranteed performance if performance is guaranteed, wherein the storage module further stores constraint information, which is information of a physical arrangement of the plurality of virtual machines and includes information indicating whether virtual machines can and cannot share a same physical computer, wherein the memory further stores instructions that when executed by the processor cause the processor to preferentially determine the allocation amount of the physical computing resource and the time slot for the allocation for each of the plurality of groups for the at least one of the plurality of virtual machines to guarantee the performance indicated in the setting information, and determine the plurality of virtual machines to which the same physical computer is to be allocated and the plurality of virtual machines to which different physical computers are to be allocated based on the constraint information, and wherein the schedule is created based on the determination.

5. The control system according to claim 4, wherein the plurality of groups comprise:
a first group into which one of the plurality of virtual machines exhibiting a load fluctuation that falls within a predetermined range during the predetermined period is classified;
a second group into which one of the plurality of virtual machines exhibiting a fluctuation of the load increasing or decreasing periodically at a predetermined period is classified;

a third group into which one of the plurality of virtual machines exhibiting a fluctuation of the load increasing or decreasing at a predetermined rate within a period of time is classified; and a fourth group into which one of the plurality of virtual machines exhibiting a fluctuation of the load changing irregularly is classified.

6. The control system according to claim 5, wherein the physical computing resource comprises a CPU of the physical computer; and wherein the allocation schedule creation module allocates the CPU of the physical computer that differs depending on each of the plurality of groups to the at least one of the plurality of virtual machines classified into the first group to the fourth group.

* * * * *